US009221506B1

(12) United States Patent  
Georgeson et al.

(10) Patent No.: US 9,221,506 B1
(45) Date of Patent: Dec. 29, 2015

(54) LOCATION TRACKING AND MOTION CONTROL OF AUTOMATED MARKING DEVICE

(71) Applicant: The Boeing Company, Chicago, IL (US)

(72) Inventors: Gary E. Georgeson, Tacoma, WA (US); John R. Linn, Maple Valley, WA (US); James J. Troy, Issaquah, WA (US); Karl Edward Nelson, Shoreline, WA (US); Daniel J. Wright, Mercer Island, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 13/948,195

(22) Filed: Jul. 23, 2013

Related U.S. Application Data

(63) Continuation-in-part of application No. 13/210,899, filed on Aug. 16, 2011, now Pat. No. 8,738,226.

(60) Provisional application No. 61/509,098, filed on Jul. 18, 2011.

(51) Int. Cl.
*B25J 5/00* (2006.01)
*B62D 57/024* (2006.01)
(Continued)

(52) U.S. Cl.
CPC ............... *B62D 57/024* (2013.01); *B05C 1/00* (2013.01); *B05D 7/00* (2013.01); *B25J 5/007* (2013.01);
(Continued)

(58) Field of Classification Search
CPC ...... B60B 19/003; B60B 19/12; B60B 19/00; B62D 57/024; B62D 55/265; B62D 55/00; B62D 55/075; B62D 57/00; B62D 57/02; B62D 57/032; B64D 45/00; B64F 5/0045; B64F 5/0009; B64F 5/0018; B64F 5/0081; Y10S 901/01; B05C 1/00; B05D 7/00; B25J 5/007; B25J 5/00; G05D 1/00; G05D 1/0236; G05D 1/027; G05D 1/0272; B63B 59/10; F41J 1/01; F41J 2/00
USPC ...................... 318/568.12; 701/36; 901/1, 44
See application file for complete search history.

(56) References Cited

U.S. PATENT DOCUMENTS 5,031,458 A * 7/1991 Young et al. ..................... 73/636
5,351,773 A * 10/1994 Yanagisawa ................... 180/8.5
(Continued)

FOREIGN PATENT DOCUMENTS

WO WO 03101664 A1 * 12/2003

OTHER PUBLICATIONS

White, T. S., et al. "A mobile climbing robot for high precision manufacture and inspection of aerostructures." The International Journal of Robotics Research 24.7 (2005): 589-598.*

*Primary Examiner* — Khoi Tran
*Assistant Examiner* — Dale Moyer
(74) *Attorney, Agent, or Firm* — Ostrager Chong Flaherty & Broitman P.C.

(57) ABSTRACT

A system in accordance with one embodiment comprises a marking device attached to a holonomic-motion crawler vehicle capable of movement on non-horizontal surfaces. Modular attachment and motion control interfaces on the platform allow attachment of various types of marking and non-destructive inspection (NDI) sensor modules. The crawling vehicle marks the location of sub-surface features on an aircraft skin or overlaid patch (doubler) using a pen or sticker or tape applicator that is guided based on either a 3-D CAD model or NDI data collected as the vehicle crawls. A second embodiment utilizes an automated NDI scanner to collect 2-D image data of the substructure to enable manual or automated feature/edge selection for marking. Location tracking of the marking device can be implemented using a local positioning system or a motion capture system.

20 Claims, 14 Drawing Sheets

(51) Int. Cl.
  *G05D 1/02* (2006.01)
  *B05C 1/00* (2006.01)
  *B05D 7/00* (2006.01)
  *G05D 1/00* (2006.01)
  *B64F 5/00* (2006.01)
  *F41J 2/00* (2006.01)
  *B62D 55/265* (2006.01)
  *B60B 19/00* (2006.01)

(52) U.S. Cl.
  CPC ............. *B64F 5/0045* (2013.01); *B64F 5/0081* (2013.01); *G05D 1/00* (2013.01); *G05D 1/0236* (2013.01); *B60B 19/003* (2013.01); *Y10S 901/01* (2013.01)

(56) References Cited

U.S. PATENT DOCUMENTS

| | | | |
|---|---|---|---|
| 5,429,009 A * | 7/1995 | Wolfe et al. | 73/865.8 |
| 5,468,099 A * | 11/1995 | Wheetley et al. | 408/1 R |
| 6,824,628 B2 | 11/2004 | Anderson et al. | |
| 7,148,644 B2 | 12/2006 | Yourlo et al. | |
| 7,643,893 B2 | 1/2010 | Troy et al. | |
| 7,859,655 B2 | 12/2010 | Troy et al. | |
| 7,984,564 B2 | 7/2011 | Weigel | |
| 2003/0048081 A1* | 3/2003 | Seemann | 318/68 |
| 2004/0149860 A1* | 8/2004 | LeCroy, Jr. | 244/161 |
| 2005/0113975 A1* | 5/2005 | Seemann | 700/245 |
| 2005/0217394 A1* | 10/2005 | Langley et al. | 73/865.8 |
| 2010/0030378 A1* | 2/2010 | Choi et al. | 700/245 |
| 2012/0103705 A1* | 5/2012 | Schlee et al. | 180/14.1 |
| 2012/0320372 A1 | 12/2012 | Troy et al. | |
| 2012/0327187 A1 | 12/2012 | Troy et al. | |
| 2013/0024067 A1 | 1/2013 | Troy et al. | |
| 2013/0140801 A1* | 6/2013 | Schlee et al. | 280/762 |
| 2014/0152803 A1* | 6/2014 | Carlson et al. | 348/84 |
| 2015/0003927 A1* | 1/2015 | Spishak et al. | 408/1 R |

* cited by examiner

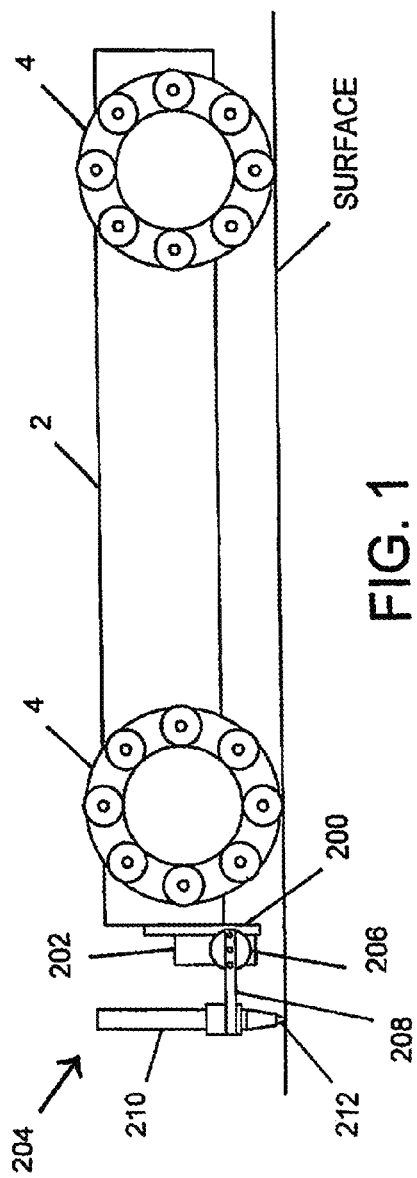
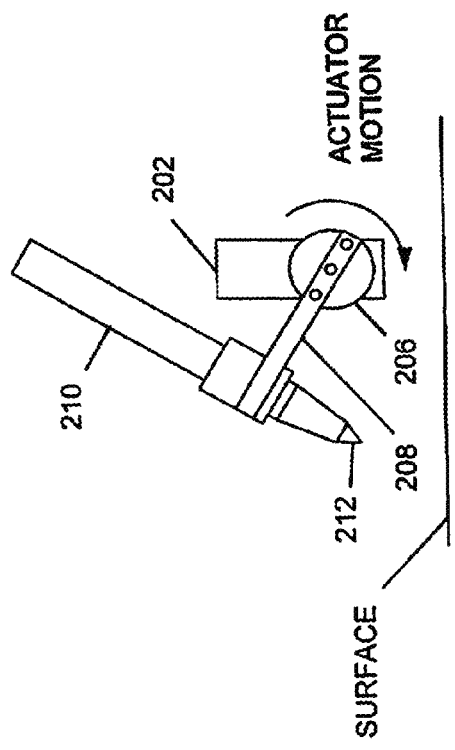
FIG. 1
FIG. 1A

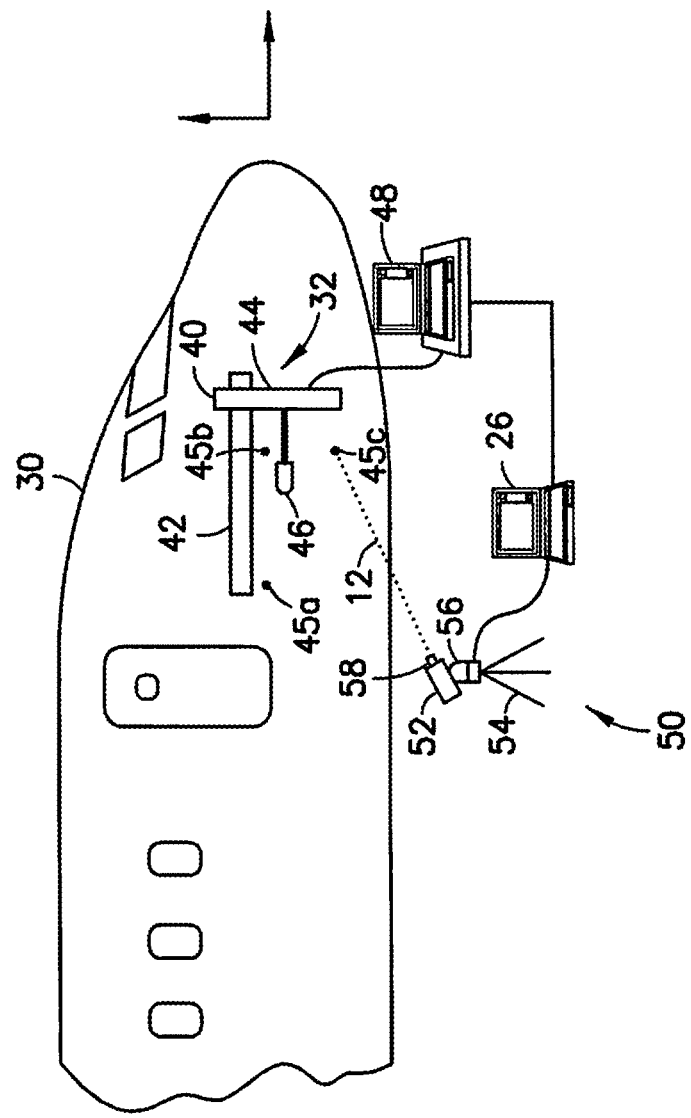

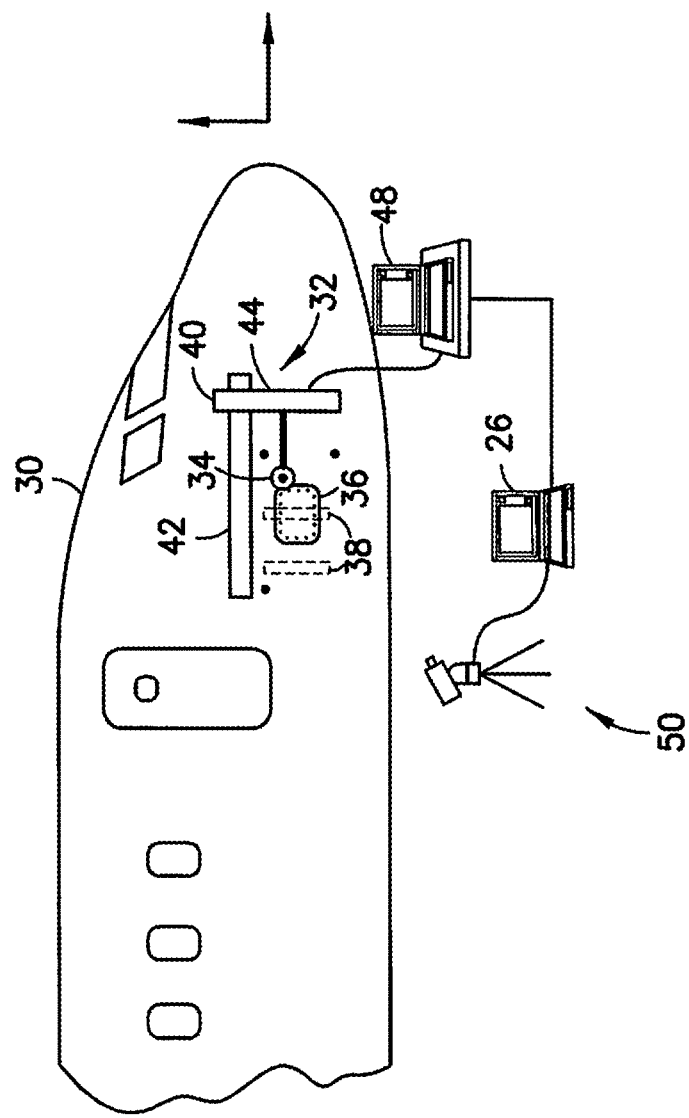

LOCATION TRACKING AND MOTION CONTROL OF AUTOMATED MARKING DEVICE

RELATED PATENT APPLICATIONS

This application is a continuation-in-part of and claims the benefit of priority from U.S. patent application Ser. No. 13/210,899 filed on Aug. 16, 2011 (the disclosure of which is incorporated by reference herein in its entirety), which application in turn claims the benefit of priority from U.S. Provisional Application No. 61/509,098 filed on Jul. 18, 2011.

The disclosures of the following additional patent applications are also incorporated by reference herein in their entireties: U.S. patent application Ser. No. 13/921,246 filed on Jun. 19, 2013; U.S. patent application Ser. No. 13/796,584 filed on Mar. 12, 2013; U.S. patent application Ser. No. 13/744,730 filed on Jan. 18, 2013; U.S. patent application Ser. No. 13/166,613 filed on Jun. 22, 2011 (published as U.S. Patent Application Publ. No. 2012/0327187); U.S. patent application Ser. No. 12/235,161 filed on Sep. 22, 2008 (issued as U.S. Pat. No. 7,859,655 on Dec. 28, 2010); and U.S. patent application Ser. No. 11/459,631 filed on Jul. 24, 2006 (issued as U.S. Pat. No. 7,643,893 on Jan. 5, 2010).

BACKGROUND

This disclosure generally relates to methods for marking surface skins of an airplane or other structure to indicate the locations of features below the surface which are not visible from the outside. Being able to accurately mark feature locations is a key step in correctly performing maintenance tasks.

On airplane fuselages, riveted repairs are common, yet often complex. When drilling new holes for the repair, edges of overlaid patches (sometimes referred to as doublers or triplers) and other features need to be avoided. At the same time, the existing hidden fasteners in the stringers and frame are located to mate the repair to the skin. The front of an airplane has rapid change of diameter, so the stringers are not perpendicular to the fillers/doublers/triplers in this region. Without knowledge of the location of features and care in selecting the drilling locations, damage can occur due to partial holes. If this happens, more extensive repair than originally planned is often required. In order to help prevent drilling into edges, a repair technician will mark their locations using a ruler and marking pen. The specific locations for the drill holes may also be marked. Marking may be required around windows, cut-out areas, and lap joint modifications as well.

It would be desirable to provide an automated method for visually indicating hidden substructure features below and/or drill locations on a surface (or overlaid patch) to support structural maintenance operations such as inspection and repair.

SUMMARY

The automated systems and methods disclosed hereinafter have the capability to mark specific locations on a level or non-level surface skin of a target object. For purposes of illustration, embodiments will be described which are capable of visually indicating hidden substructure features and/or drill locations during aircraft inspection and repair. However, it should be appreciated that the principles disclosed herein also have application during inspection and repair of non-aircraft structures.

In accordance with some embodiments, the foregoing capability is provided by mounting a marking instrument on a holonomic-motion crawler vehicle with surface attraction capability. In accordance with other embodiments, this capability is provided by mounting a marking instrument on a non-holonomic motion platform movably coupled to a support rail which is attached to the surface to be marked. In either case, continuously updated location tracking can be used to track the location (i.e., position and orientation) of the marking instrument, and feedback motion control can be used to control the motion of the marking instrument. When used in conjunction with non-destructive inspection scanning that reveals the location of features hidden below the surface skin of the target object, the locations of hidden features can be marked.

In one embodiment, the crawler vehicle marks the aircraft skin or overlaid patch (e.g., doubler) with a marking instrument such as a pen, using either a 3-D CAD model or non-destructive inspection (NDI) data acquired by the crawler vehicle as a guide. Another embodiment utilizes an automated NDI scanner to collect two-dimensional (2-D) image data of the substructure to enable manual or automated feature/edge selection for marking.

The holonomic-motion crawler vehicle disclosed hereinafter has the capability to place a tip of a marking instrument at a specific location on a surface of a target object and move it in any direction and with any orientation while the tip is engaged with the surface. The location of the tip of the marking instrument is controlled by a motion controller. For a marking instrument that has a pointed tip (e.g., a marker pen), position control (without orientation control) is sufficient to perform an automated marking function. However, for other applications in which the marking instrument does not have a pointed tip, the motion controller can control both position and orientation of the marking instrument. Orientation control allows the use of chisel-tip marking tools where the width of the marked line can be controlled, such as artists do with calligraphy pens. Spray-paint devices with fan spray tips that create a thin divergent beam of paint also fit into this category.

An additional feature of the automated marking system with holonomic-motion crawler vehicle disclosed herein are control techniques that allow the operator (human or automated) to control any point of known location relative to the center of the crawler vehicle. This enables the operator to concentrate on controlling the marking instrument, not the crawler vehicle. For example, the marking instrument may be located in the center, forward, behind, or off to one side of the crawler vehicle, and the location of the marking instrument is controlled by having the system compute the required wheel motion in order to generate the desired motion at the marking instrument location.

One aspect of the subject matter disclosed in detail hereinafter is an apparatus comprising a holonomic-motion crawler vehicle, an actuator mounted to the holonomic-motion crawler vehicle, and a marking device coupled to the actuator. The actuator has a first state in which the marking device moves relative to the holonomic-motion crawler vehicle from a retracted position to an extended position, and a second state in which the marking device moves relative to the holonomic-motion crawler vehicle from the extended position to the retracted position. In accordance with one embodiment, the marking device comprises a marking instrument having a tip. In accordance with alternative embodiments, the marking device comprises a sticker or tape applicator or a paint sprayer.

Another aspect of the subject matter disclosed in detail hereinafter is a system comprising: a target object having a surface; a motion platform in contact with the surface and located at an initial location relative to a frame of reference of the target object; an actuation system for causing the motion platform to move relative to the frame of reference of the target object; a marking device supported by the motion platform, the marking device; an actuator for causing the marking device to move relative to the motion platform between a retracted state wherein a part of the marking device is not in contact with the surface and an extended state wherein the part of the marking device is in contact with the surface; a location tracking system programmed to be capable of determining a current location of the part of the marking device relative to the frame of reference of the target object when the part of the marking device is in contact with the surface; and a motion controller programmed to be capable of controlling motion of the motion platform relative to the surface and controlling motion of the marking device relative to the motion platform. The motion of the motion platform relative to the surface is a function of a difference between the current location of the part of the marking device as determined by the location tracking system and a target location of the part of the marking device.

A further aspect is a method of marking locations on a surface, comprising: moving a platform over a surface area along a programmed motion path; scanning the surface area using a scan probe mounted to the platform as the platform is moved along the programmed motion path to acquire scan data, wherein the scan data comprises subsurface feature data; correlating model feature data with the subsurface feature data; selecting a target location on the surface area to be marked based on results of the correlating step; moving the platform over the surface area to a location whereat a part of a retracted marking device carried by the platform would overlie the target location if the marking device were extended; and extending the marking device so that the part of the marking device contacts the surface or a patch overlying the surface. The method may further comprise moving the platform over the surface area along a motion path that causes the part of the extended marking device to contact the surface along a line that starts at the target location. The method further comprises tracking the location of optical targets arranged in a known pattern on the platform using a local positioning system or a motion capture system.

Yet another aspect is a method for marking a surface on a target object using a computer-controlled crawler vehicle that carries a marking device and a non-destructive scan probe. The method comprises: moving the crawler vehicle so that the non-destructive scan probe scans an area of the surface to acquire a scan image of that scanned surface area; selecting a feature having a target location within the scanned surface area; moving the crawler vehicle so that a part of the marking device overlies the target location; and actuating the marking device so that the part marks the target location. The method may further comprise: acquiring relative motion data representing incremental motion of the crawler vehicle; and controlling the motion of the crawler vehicle as a function of the relative motion data.

Other aspects are disclosed and claimed below.

BRIEF DESCRIPTION OF THE DRAWINGS

FIG. 1 is a schematic side view of a holonomic-motion crawler vehicle equipped with a marking device. The marking device is shown in an extended state.

FIG. 1A is a schematic side view of the marking device of FIG. 1 in a retracted state.

FIGS. 9A and 9B are diagrams showing components of a system that combines a local positioning system positioned at a stand-off distance from an aircraft with a scanning system mounted on a surface of the aircraft's fuselage. In FIG. 9A, the scanning system is shown equipped with an NDI probe; in FIG. 9B, the scanning system is shown equipped with a marking instrument.

Reference will hereinafter be made to the drawings in which similar elements in different drawings bear the same reference numerals.

DETAILED DESCRIPTION

Figure 2:
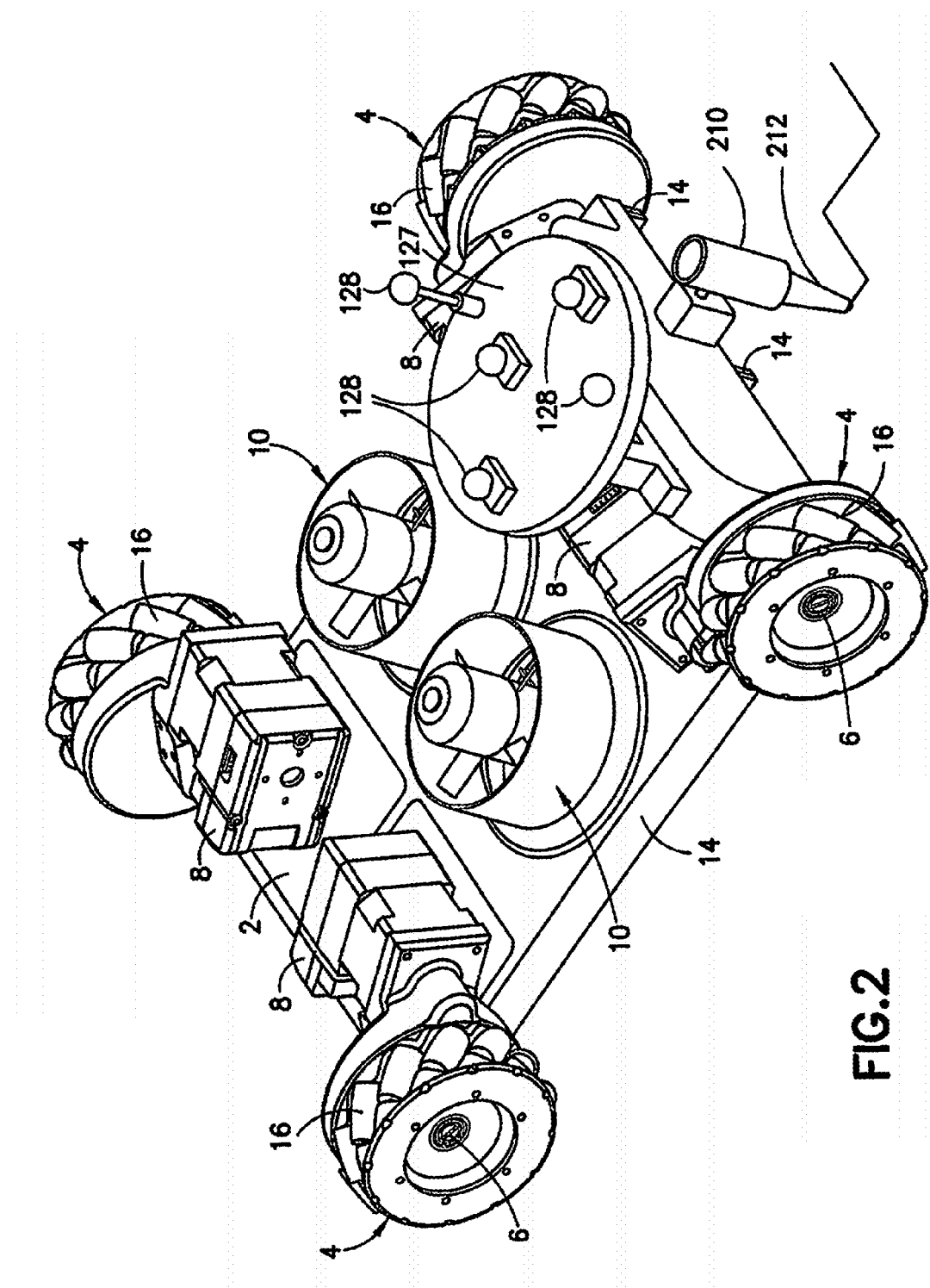
FIG. 2 is a schematic isometric view of parts of a holonomic-motion crawler vehicle having two suction zones in accordance with one embodiment. The electrical connections for supplying signals for controlling operation of the depicted components and other components are not shown.

The automated systems and methods disclosed herein have the capability to place a marking instrument at a specific location on a level or non-level surface skin of a target object or overlaid patch (e.g., doubler). For purposes of illustration, embodiments will be described which are capable of visually indicating hidden substructure features and/or drill locations during aircraft inspection and repair. However, it should be appreciated that the principles disclosed herein also have application during inspection and repair of non-aircraft structures.

In accordance with one embodiment, automated marking of a surface to indicate locations of subsurface features is implemented by mounting a marking instrument on a crawler vehicle. As the crawler vehicle moves during a marking operation, the location (i.e., position and orientation) of a tip of the marking instrument is continuously tracked. The motion of the marking instrument tip is controlled based on feedback from a location tracking system so that the marking instrument follows a programmed motion path.

FIG. 1 shows portions of a crawler vehicle that is equipped with a marking device 204. The crawler vehicle comprises a frame 2 with four wheels 4 (only two wheels are visible in FIG. 1) rotatably coupled to the frame 2. The marking device 204 is shown in an extended state in FIG. 1 and in a retracted state in FIG. 1A. The device further comprises an actuator 202 (e.g., a rotational servo motor) which is mounted to the frame 2 of the crawler vehicle by means of a mounting plate 200. The marking device 204 is rotatably coupled to an output shaft (not visible in FIG. 1) of actuator 202. The actuator 202 can be activated to cause the marking device 204 to rotate relative to frame 2 from its retracted position to its extended position at the start of a marking operation. Conversely, the actuator 202 can be activated to cause the marking device 204 to rotate from its extended position to its retracted position at the end of a marking operation.

In accordance with the embodiment depicted in FIG. 1, the marking device 204 comprises: a hub 206 attached to an end of the output shaft of actuator 202; an arm 208 having a proximal end attached to the hub 206; and a marking instrument 210 mounted to a distal end of arm 208 in the form of a yoke. The marking device 204 is rotated when the output shaft of actuator 202 rotates. The marking instrument 210 further comprises a reservoir for ink (not shown in FIG. 1) and a contact tip 212. When the marking device 204 is in its extended state (shown in FIG. 1), the contact tip 212 of the marking instrument 210 is in contact with the surface to be marked. When the marking device 204 is in its retracted state (shown in FIG. 1A), the contact tip 212 of the marking instrument 210 is not in contact with the surface.

In accordance with alternative embodiments, the marking device can be actuated by linear motion instead of rotation. For example, the marking device can be coupled to the crawler vehicle by means of a vertical lifting mechanism. This vertical lifting mechanism may use a rotational servo actuator with a rack-and-pinion mechanism to turn the rotational motion of the servo into linear (translational) motion.

In accordance with an embodiment, the marking instrument-equipped crawler vehicle is capable of holonomic motion. A holonomic motion system is one that is not subject to motion constraints. This type of system can translate in any direction while simultaneously rotating. The holonomic-motion crawler vehicle disclosed in detail hereinafter can move on horizontal surfaces and can climb vertical surfaces. This combination of capabilities can be achieved by using a suction generation system that equalizes or evenly distributes the normal loads on the Mecanum wheels so that the lateral forces needed by the wheels can be generated. The motion of the resulting platform can be controlled to enable general-purpose positioning for precise motion control of the tip of the marking instrument.

One embodiment of a holonomic-motion crawler vehicle capable of traveling on a non-horizontal surface will now be described with reference to FIGS. 2, 3, 4A, and 4B. This vehicle may comprise a platform having four Mecanum wheels 4 and a suction or vacuum creation system for holding the platform with sufficient traction against a surface. However, the platform may have any multiple of four Mecanum wheels, e.g., four, eight, etc. In alternative embodiments, omni wheels can be employed in place of Mecanum wheels and the surface attraction capability of the crawler vehicle may be based on magnetic or electrostatic sources of attraction instead of suction.

A Mecanum-wheeled vehicle is a holonomic system, meaning that it can move in any direction while simultaneously rotating. This is possible because of the shape of the wheels. The standard configuration for a Mecanum-wheeled vehicle has four Mecanum wheels (two type "A" and two type "B"). The Mecanum wheels are arranged with the "A" pair on one diagonal and the "B" pair on the other. A Mecanum-wheeled vehicle can be made to move in any direction and turn by varying the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type "A" wheels at the same rate but in the opposite direction of the rotation of the Type "B" wheels causes sideways movement.

Figure 3:
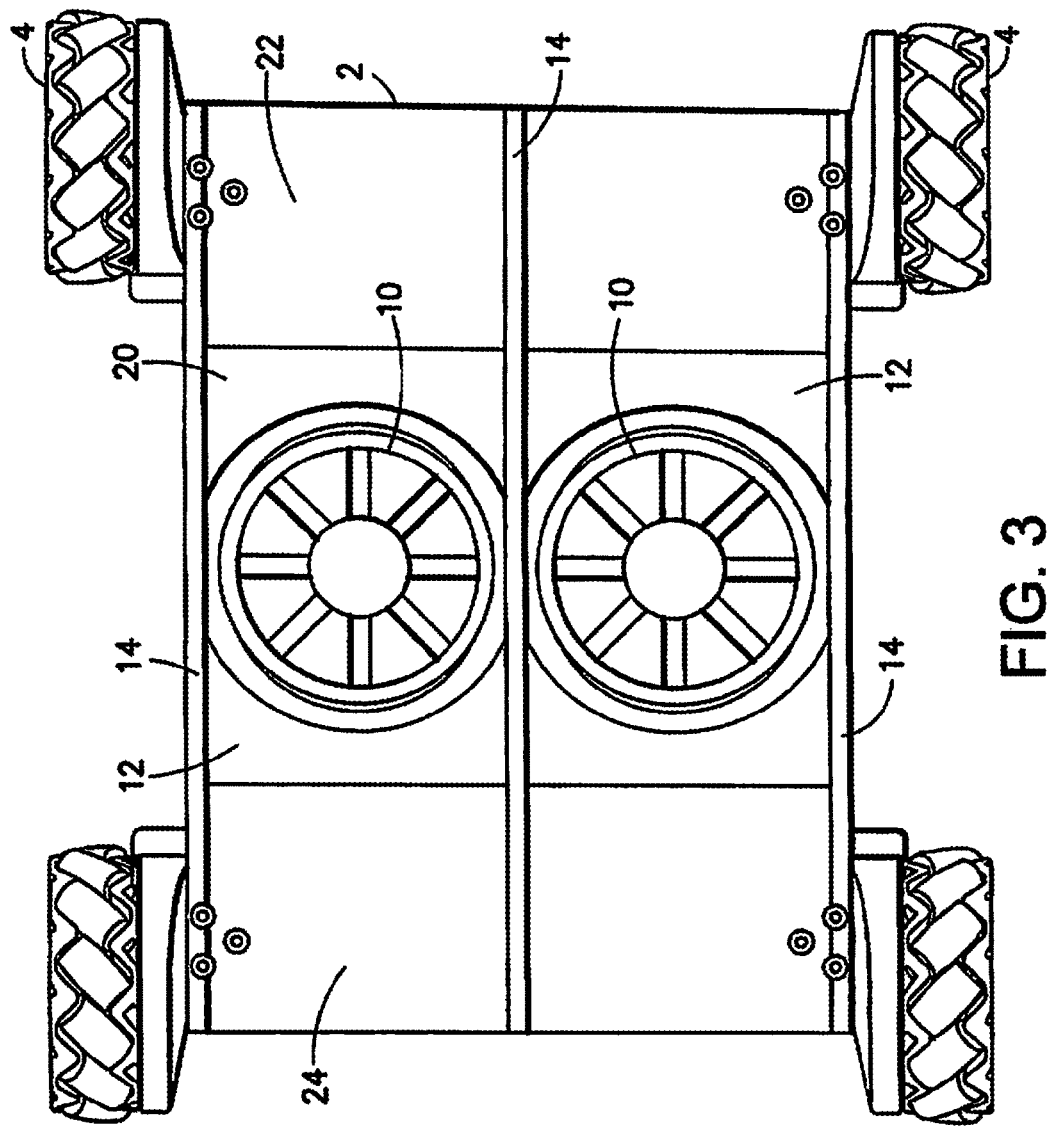
FIG. 3 is a schematic bottom view of a holonomic-motion crawler vehicle having two suction zones in accordance with the embodiment depicted in FIG. 2.

FIG. 2 shows parts of a marking instrument-equipped holonomic-motion crawler vehicle two low-pressure (e.g., suction) zones (not visible in FIG. 2, but see FIG. 3). The electrical connections for supplying signals for controlling operation of the depicted components are not shown. This holonomic-motion platform comprises a frame 2 with four Mecanum wheels 4 (two type "A" and two type "B") mounted to the frame by means of respective axles 6, and further comprises four independently controlled stepper motors 8 (one per wheel). The Mecanum wheels 4 are arranged with the "A" pair on one diagonal and the "B" pair on the other. Rotation of each wheel 4 is driven by a respective drive motor 8 (e.g., a stepper motor). Each Mecanum wheel 4 has a multiplicity of tapered rollers 16 rotatably mounted to its circumference, each roller being freely rotatable about its axis. In one embodiment these rollers have an axis of rotation which lies at a 45° angle with respect to the plane of the wheel. The vehicle can be made to move in any direction and turn by varying the speed and direction of rotation of each wheel.

The embodiment depicted in FIG. 2 also has two suction devices arranged side by side in the middle of the frame 2, midway between the front and rear wheels. In this particular embodiment, each suction device is a respective electric ducted fan 10 which is mounted in a respective opening (not shown in FIG. 2) formed in the frame. Each electric ducted fan 10 comprises a fan which is rotatable about an axis, a duct surrounding the fan, and an electric motor which drives the fan to rotate in a direction such that air is propelled from a respective channel or space underneath the frame (hereinafter "suction zone") up through the fan duct, thereby creating suction in the corresponding suction zone. The two suction zones are bounded on opposing sides by longitudinal low-surface-friction flexible skirts 14 which are attached to the frame 2, the middle skirt forming a common boundary wall separating the two suction zones. The skirts may extend downward so that their bottom edges contact the surface on which the vehicle is moving.

Although not shown in FIG. 2, the crawler vehicle can be tethered to a support system by a cable which supplies electrical power to the stepper motors 8 and electric ducted fans 10 on the vehicle. The cable also provides control signals from a controller (e.g., a computer) which controls the operation of the marking device actuator 202, the stepper motors (for rotating the Mecanum wheels), and electric ducted fans. The crawler vehicle further comprises a converter box (not shown) mounted to the frame 2. The converter box converts USB signals from the controller (not shown) into pulse-width-modulated (PWM) signals for controlling the electric ducted fan motors.

In accordance with an alternative embodiment, the crawler vehicle could be battery-powered, instead of receiving electrical power via the tether cable. Also the motor controller could be a microprocessor or microcomputer mounted onboard the crawler vehicle, rather than using a ground-based computer to control the vehicle by means of controls signals carried by a tether cable. Alternatively, the motors onboard the crawler vehicle can be controlled via a wireless connection to an off-board controller.

The frame 2 of the vehicle requires some amount of compliance to keep all of the wheels in contact with a surface without slipping. If only three of the four wheels are in contact with the surface and can generate traction, the vehicle will not respond properly to motion inputs. One way to address the wheel contact issue is to build a frame with low torsional stiffness. Another way is to provide suspension for one or more of the wheels. For a Mecanum-wheeled vehicle to function properly on inclined, vertical or inverted surfaces, there are additional issues to be addressed. For example, in order to generate the proper vehicle motion, the forces on the wheels need to be sufficient to generate the required traction. If one or more of the wheels begin to slip or stall, the required forces at that corner of the vehicle will not be produced, resulting in an undesired overall vehicle motion.

FIG. 3 shows a bottom view of the crawler vehicle depicted in FIG. 1. The underside of the frame 2 is shaped to provide two suction zones 12 that can be controlled independently. (In alternative embodiments, more than two suction zones can be employed.) The crawler vehicle depicted in FIG. 3 further comprises low-surface-friction skirts 14 that conform to non-flat surfaces, including a central common skirt which bisects the bottom surface of the frame along a longitudinal axis. Each electric ducted fan 10 is installed in a respective opening in the frame and is in fluid communication with a respective suction zone 12 defined by the frame bottom surface and the skirts. When the fans 10 are turned on, each fan propels air upward, thereby sucking air from the shaped suction zones 12. The electric ducted fans 10 can be independently controlled to apply different suction forces to the surface underneath the respective suction zones 12, which allows the system to control the amount of force exerted on the wheels 4 by the contacting surface.

In the particular construction depicted in FIG. 3, the upper half of the bottom surface between the uppermost and middle skirts 14 comprises a flat central surface 20 having an opening in which the fan of the electric ducted fan is installed. This flat central surface 20 is flanked by forward and rearward convex surface 22 and 24. Each convex surface 22 and 24 may be an aerodynamically streamlined surface which forms a respective throat with opposing portions of the surface on which the vehicle is moving. Thus, the contoured bottom surface of the frame, the skirts and the surface on which the vehicle is moving define respective channels that allow sufficient air to be sucked up through the corresponding electric ducted fan to generate a desired suction force. The portion of each channel between the lowest points of the convex surfaces 22 and 24 forms a respective suction zone 12. In the particular embodiment depicted in FIG. 3, the suction zones are separated by the middle skirt and are in fluid communication with the respective openings in which the ducted fans are installed. These openings may be substantially conical along a lowermost portion thereof to facilitate the flow of air out the suction zone.

The ability to control the suction in the various zones under the vehicle allows the load on the wheels in the direction perpendicular to the surface normal to be controlled, which in turn provides the ability to increase the lateral force on the wheels through the equation $F=\mu N$, where F is the lateral force, $\mu$ is the coefficient of friction, and N is the normal force.

Figure 4A:
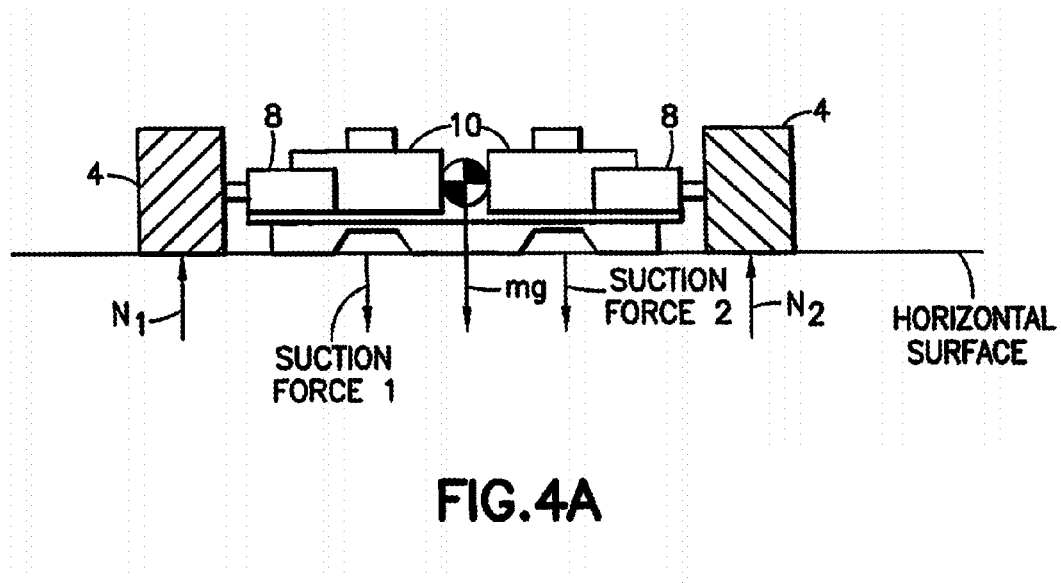
FIGS. 4A and 4B are schematic front views of portions of a crawler vehicle that has multiple operating suction zones. The arrows in these diagrams indicate the forces exerted by a horizontal surface (see FIG. 4A) and by an inclined surface (see FIG. 4B) on the Mecanum wheels of a holonomic-motion crawler vehicle.

To avoid any problem due to non-equal wheel forces when the crawler vehicle is on an inclined surface, the crawler vehicle should include at least two suction zones. FIG. 4A shows arrows which indicate the forces exerted by a horizontal surface on the Mecanum wheels 4 of the crawler vehicle depicted in FIG. 3. When the suction forces generated by the respective electric ducted fans 10 are equal, the normal forces on the Mecanum wheels 4 on the left- and right-hand sides of the vehicle are equal, i.e., $N_1=N_2$.

Figure 4B:
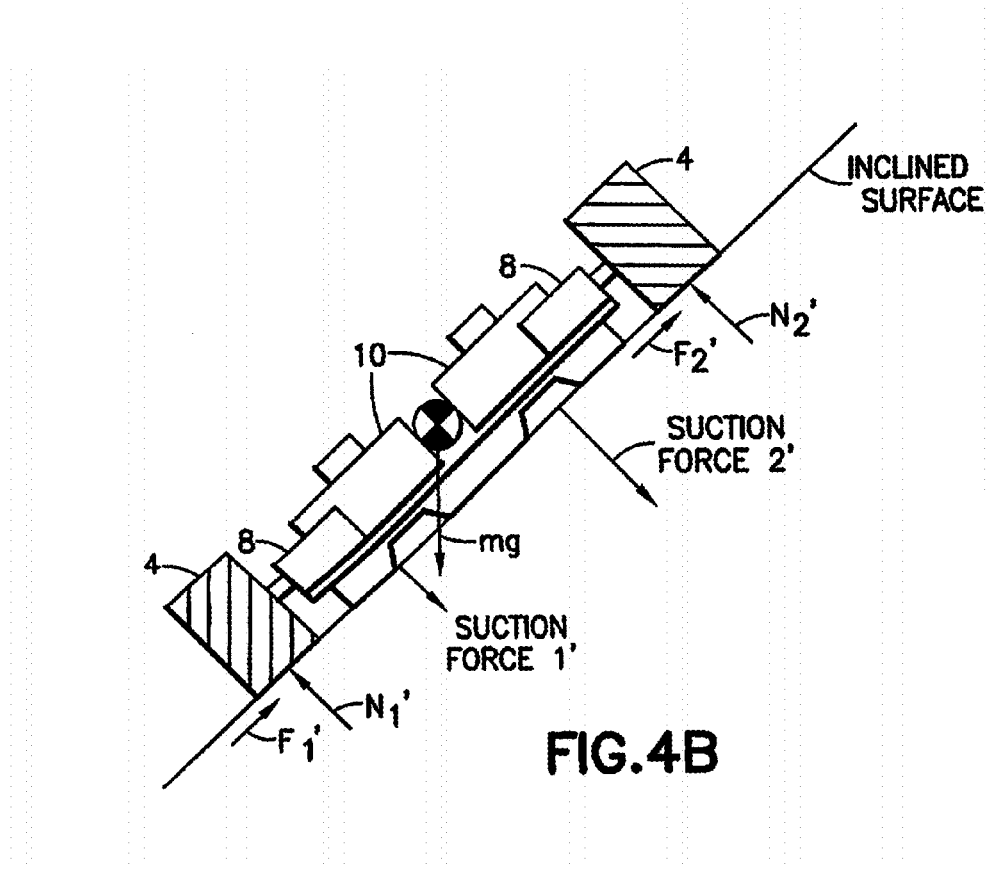

In contrast, FIG. 4B shows arrows indicating the forces exerted by an inclined surface on the Mecanum wheels 4 of the crawler vehicle depicted in FIG. 3. The speed of the electric ducted fans 10 can be controlled to produce different suction forces in their respective suction zones 12. When the suction force generated by the electric ducted fan disposed at a relatively higher elevation is greater by a certain amount than the suction force generated by the electric ducted fan disposed at a relatively lower elevation, the frictional and normal forces exerted by the inclined surface on the Mecanum wheels 4 on the left- and right-hand sides of the vehicle can be equalized, i.e., $F_1'=F_2'$ and $N_1'=N_2'$. Thus the suction in the upper zone can be increased relative to that of the lower zone, resulting in an increase in the normal load on the upper wheels. The respective electric ducted fans 10 are controlled as a function of the angle of inclination of the non-horizontal surface on which the vehicle is situated. The balance between the zones 12 can be controlled by using a sensor (not shown), such as an electronic inclinometer sensor, installed on the frame 2 to measure the relative angle between the frame and the gravity vector mg. The electronic inclinometer sensor returns angle of inclination data to the controller, which uses the data for controlling the electric ducted fans.

While making a rotation maneuver on an inclined, vertical or inverted surface, the suction in the multiple zones under the Mecanum-wheeled vehicle will be automatically changed by the control software or hardware as the wheel loads in the normal direction change. The change in suction is performed in order to achieve balanced loads on the wheels. Suction in the various zones may also change as the vehicle moves over a curved surface. In some embodiments, the relative amounts of suction in each zone are controlled by using data from a gravity vector sensing device, such as an inclinometer. In other embodiments, load sensors for each wheel may be used to determine the required amount of suction.

Returning to FIG. 2, the holonomic-motion crawler vehicle carries a marking instrument 210 having a tip 212 for automated marking of a surface. In the situation depicted in FIG. 2, the tip 212 has been moved along a programmed marker path with the marking instrument 210 extended to draw the line shown. The programmed marker path traveled by the tip 212 of marking instrument 210 is created by controlled movement of the holonomic-motion crawler vehicle, as will be explained in further detail below.

The movement of the holonomic-motion crawler vehicle during marking can be tracked and controlled using a location system, such as a local positioning system of the type disclosed in U.S. patent application Ser. No. 13/921,246 or a motion capture system of the type disclosed in U.S. Pat. No. 7,643,893.

In the embodiment depicted in FIG. 2, the holonomic-motion crawler vehicle is equipped with a rigid platform 127 (e.g., a rigid disk) that carries a plurality of passive retro-reflective markers 128 arranged in a unique pattern for tracking by a motion capture system. The presence of these retro-reflective markers 128 allows the holonomic-motion crawler vehicle to be tracked and controlled using a motion capture system of the type described in U.S. Pat. No. 7,643,893. Each object to be tracked using a motion capture system should have at least three passive retro-reflective markers attached thereto. In the implementation shown in FIG. 2, the crawler vehicle has five retro-reflective markers 128.

Figure 5:
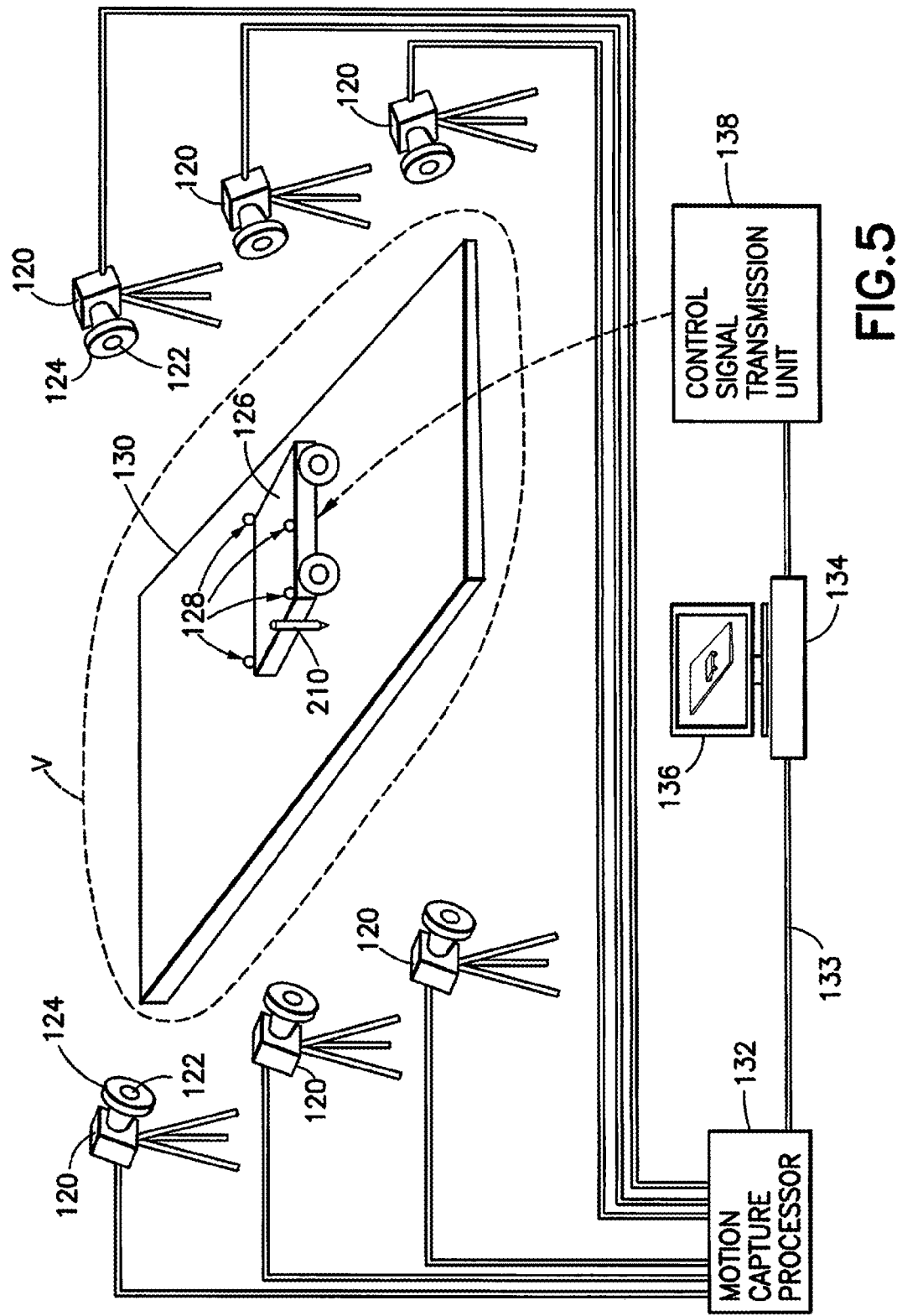
FIG. 5 is a hybrid diagram that includes a schematic isometric view of some portions of a motion capture and control system in accordance with one embodiment which is suitable for tracking the location of a crawler vehicle. Other portions of the motion capture and control system are represented in a block diagram format.

A motion capture system in accordance with one embodiment is shown in FIG. 5. A holonomic-motion crawler vehicle 126, carrying a marking instrument 210 and four retro-reflective markers 128 arranged in a unique pattern, can be tracked using multiple off-board cameras 120 as the vehicle travels over a surface, e.g., a surface of a wing 130 of an airplane. The embodiment shown in FIG. 5 has a motion capture processor 132 which collects real-time image information from all instances of the motion capture cameras 120, processes the data, and sends the processed data along a dedicated or network connection to a crawler navigation and control computer 134. The position and orientation of the crawler vehicle 126 are controlled by the crawler navigation and control computer 134 via a control signal transmission unit 138 and a wired or wireless control link (indicated by the dashed arrow).

Processes for calibrating the motion capture system shown in FIG. 5 to a reference coordinate system and then continuously motion capture tracking the location of the marker pattern relative to the reference coordinate system are disclosed in U.S. patent application Ser. No. 13/744,730.

The information for defining the pattern of retro-reflective markers 128 mounted on crawler vehicle 126 is stored in the motion capture processor 132. The markers 128 may comprise a plurality of small spheres (e.g., about ¼ inch in diameter) attached to a rigid platform, as better seen in FIG. 2. The location of the tip of the extended marking instrument 210 relative to the marker pattern can be determined by calculating an offset position and an offset orientation in the coordinate system of the crawler vehicle. These offsets can be used to calculate a transformation matrix for converting the coordinates of the markers 128 into the coordinates of the tip of the marking instrument 210. The result is that the position and orientation of the marking instrument 210 can be defined as a function of the position and orientation of the marker pattern in the reference coordinate system (i.e., the coordinate system of the object to be marked).

Still referring to FIG. 5, each motion capture camera 120 can be a video camera of the type comprising a ring of LEDs 124 surrounding a camera lens 122. In conjunction with such cameras, each retro-reflective marker 128 may comprise a hemispherical or ball-shaped body coated with reflective paint that reflects impinging light from the LEDs 124 of each camera 120 back toward the associated lens 122 of the respective camera in a well-known manner. The motion capture system utilizes data captured from image sensors inside the cameras 120 to triangulate the three-dimensional (3-D) position of the crawler vehicle between multiple cameras configured to provide overlapping projections.

The outputs from cameras 120 are input to respective ports of the motion capture processor 132. The motion capture processor 132 collects real-time image information from all of the motion capture cameras 120, processes the image data, and sends the information along a dedicated connection to the motion tracking and applications computer 134. The display monitor 136 may be used to display three-dimensional position data for the markers and the position and orientation data of the tracked objects computed by the motion capture processor 132. Alternatively, the software functions executed by motion capture processor 132 and motion tracking and applications computer 134 can be executed by a single computer, i.e., the two hardware components can be integrated inside one enclosure.

At each frame update, the positions of all of the passive markers 128 in the capture volume can be captured by each camera 120 and converted by the motion capture processor 132 into 3-D coordinates, which are then associated with the known marker pattern for the tracked crawler vehicle 126, resulting in full 6-degree-of-freedom position and orientation representations for the tracked crawler vehicle. The coordinates of the crawler vehicle are then transformed into the coordinates of the tip of the marking instrument 210 by the motion capture processor 132. A separate data conversion application running on crawler navigation and control computer 134 accesses this marking instrument location data through a network socket connection 133 to the motion capture processor 132.

The crawler navigation and control computer 134 runs closed-loop feedback control software and operatively communicates with the crawler vehicle 126 via a communication link (indicated by a curved dashed arrow in FIG. 5). The communication link, which may be a wireless link, wire-based link, fiber-optic link, or any other suitable type of communication link, carries signals and data between the crawler navigation and control computer 134 and the crawler vehicle 126. The crawler navigation and control computer 134 is also programmed to run a command and control software program that performs a variety of functions associated with monitoring and controlling the crawler vehicle 126 and the other components of the motion capture system. In operation, the crawler navigation and control computer 134 causes appropriate command signals to be transmitted to the crawler vehicle 126 by the control signal transmission unit 138, directing the marking instrument-equipped crawler vehicle 126 to execute desired maneuvers and marking operations.

The actuator control values determined by the command and control software running on the crawler navigation and control computer 134 are converted into the format required by the communication link to the crawler vehicle 126. During movement of the crawler vehicle 126 within the capture volume V, the motion capture system tracks the positions of the retro-reflective markers 128 on the crawler vehicle 126 and generates a representation of the position and orientation (e.g., quaternion or 4×4 homogeneous transformation matrix) of a group of retro-reflective markers 128. The command and control software running on the crawler navigation and control computer 134 compares the position and orientation feedback information with the desired position and orientation of the crawler vehicle 126, determines the desired actuator inputs for controlling the movement of the crawler vehicle 126, and causes appropriate command signals to be transmitted to the crawler vehicle 126 via control signal transmission unit 138 and the communication link to controllably adjust (or maintain) the position, heading and velocity of the crawler vehicle 126. Thus, the motion capture system provides the control system with position and orientation information for a closed-loop feedback control capability for adjusting the positions and movements of the crawler vehicle 126.

In the alternative, a location tracking system can be provided which is capable of measuring the location of a movable target object (such as a marking instrument-equipped crawler vehicle) in absolute coordinates, e.g., using a local positioning system, following the completion of a motion that was tracked incrementally, e.g., using position encoders, as disclosed in U.S. patent application Ser. No. 13/921,246. This tracking method is an automated process that incorporates active lights on the target object and image processing to compute the target object position and orientation. It uses a local positioning system (LPS) of the type which has a single camera and a laser range meter on a controllable pan-tilt unit. The LPS operation and calibration process is disclosed in U.S. Pat. No. 7,859,655. If the absolute coordinate measurement system determines that the current location of the stopped target object deviates from the desired location by more than a configurable tolerance, the target object can be commanded to move toward the correct location.

Figure 6A:
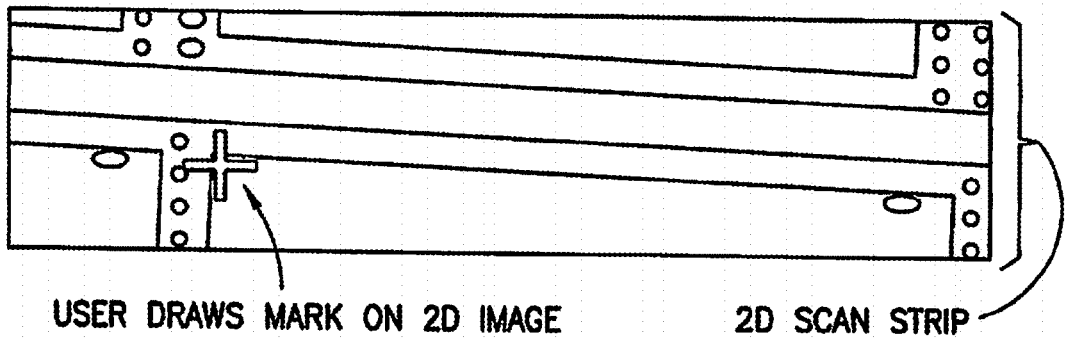
FIG. 6A is a diagram representing a view of a portion of an NDI scan image of a surface area on an aircraft skin, the image being displayed on a display screen of a computer. The NDI scan image has been marked (using a "+" symbol) to indicate a corresponding subsurface feature to be marked on the skin surface.
Figure 6B:
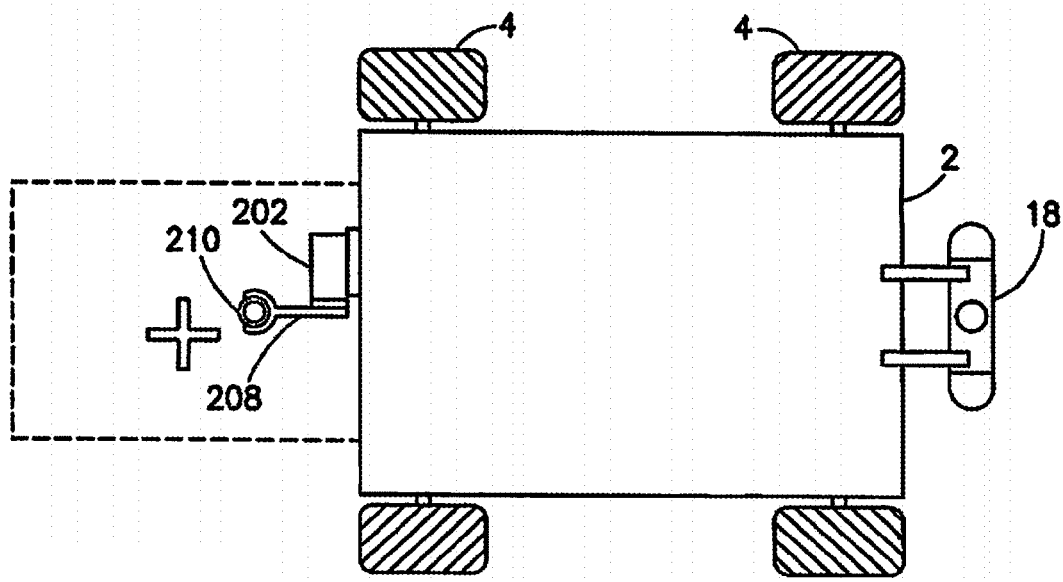
FIG. 6B is a schematic top view of a holonomic-motion crawler vehicle equipped with an NDI scan array and a marking instrument in accordance with one embodiment.

Although not shown in FIG. 5, crawler vehicle 126 may also be equipped with an NDI scanner unit for scanning a surface area to be marked. FIG. 6B is a schematic top view of a holonomic-motion crawler vehicle equipped with four Mecanum wheels 4, an NDI scan array 18 and a marking instrument 210 in accordance with one embodiment. The NDI scanner 18 may, e.g., comprise a low-frequency eddy current sensor array or an ultrasonic transducer array. The dashed lines in FIG. 6B indicate a trailing portion of a boundary of a strip of surface area A which has been scanned by NDI scanner 18 as it was moved from a position overlying the vertical dashed line to its current position as seen in FIG. 6B. The result of scanning a rectangular strip of surface area A would be a rectangular 2-D strip of scan data. One example of such a rectangular strip of scan data is presented in FIG. 6A.

One aspect of using an on-board scanner as part of the system is that there are some use cases in which the system can be used without an off-board tracking system. When performing inspections where absolute coordinates are not needed, the relative motion data provided by encoders on the crawler vehicle (or on robotic arm (X-Y plotter) types of scanners), combined with the image data from the scanner, are sufficient to allow a limited version of the marking concept to work without an external tracking system. This takes advantage of situations where the locations on the surface to be marked are not far away from the location where the scanner unit has just scanned. Since the movement of the vehicle to place the marking instrument on a spot that the scanner has just observed is small, the amount of error that builds up during the move is small. This approach provides a reasonably accurate way to mark small areas—such as drawing a box around a flaw or drawing a circle around a rivet. Not requiring an external tracking system for some types of use cases can reduce the cost of the system.

Furthermore, the 2-D surface scan data can be in a form different than typical NDI data (e.g., ultrasonic and eddy current). There exists the potential for the "scanner" element to be a video camera that can be used in cases of visual-only inspection. This type of camera could create a long strip-type of image data (similar to the way a panoramic camera works). Some types of surface inspection applications may need only visual inspection, and having the option for a camera (in addition to relative motion capability) could lower the cost of the system.

On airplane fuselages, bolted repairs are common. However, when drilling new holes for the repair, edges of overlaid patches (doublers or triplers) and other features need to be avoided. In order to prevent drilling into edges, the NDI scanner 18 on the marking instrument-equipped crawler vehicle shown in FIG. 6B can be used to acquire an NDI scan image of the repair area, as shown in FIG. 6A. Thereafter, the marking instrument-equipped crawler vehicle can be used to mark the locations of interest such as hidden features or anomalies (possible damage). The specific locations for the drill holes may also be marked. Marking may be required around windows, cut-out areas, and lap joint modifications as well. In the example shown in FIGS. 6A and 6B, the location of a hidden feature has been indicated in the scan image of FIG. 6A by a "+" symbol and the location on the surface where a mark is to be applied by the marking instrument 210 in indicated in FIG. 6B by the same symbol. The marking could be done on a scan subsequent to the NDI scan. In another embodiment, the scanning momentarily stops while the crawler vehicle 126 moves to the location where the mark is required, then moves back to where the scanning was interrupted, and begins scanning again. This motion would be a brief disruption to allow the crawler vehicle 126 to move a short distance (e.g. a few inches) to make the mark and return to the scanning process. In accordance with a further alternative, marking could be done on the same scan if the marking instrument were on a rastered mount programmed to move and lower the marking instrument to mark user- or image software-defined features.

A control computer can be programmed with location tracking software which is capable of intermittently measuring the location of a marking instrument in absolute coordinates whenever the crawler vehicle is stationary. While the scan head is moving, the encoders on the crawler vehicle track incremental movements. A local positioning system can be used to track marker location in absolute coordinates (e.g., with reference to the aircraft coordinate system), both during initial calibration and following the completion of a movement that was tracked incrementally, as taught in U.S. patent application Ser. No. 13/921,246. Alternatively, a motion capture system can be used to localize and provide location tracking of a marking instrument in the aircraft coordinate system, as taught in U.S. patent application Ser. No. 13/744,730. If the absolute coordinate measurement system determines that the current location of the tip of the marking instrument deviates from the desired location by more than a specified tolerance, the crawler vehicle can be commanded to move toward a location that will result in the correct location of the marking instrument.

Guided by either a local positioning system or a motion capture system, the crawler vehicle can be programmed to travel over a surface of a structure on a pre-defined path. The location of the crawler vehicle can be tied to the coordinate system of the structure being marked, e.g., an aircraft, and therefore can be programmed to follow the internal structure (such as chemically milled pocket edges) for the purposes of inspection, and can tie inspection data back to the aircraft CAD model.

The information provided by an NDI scan can be used to determine the locations of structural edges and fastener hole locations. The scanning and marking for drill guidance can be done on separate runs of the crawler vehicle or on the same run.

An inspection, marking, and repair process in accordance with one embodiment will now be described with reference to FIGS. 7 and 8.

Figure 7:
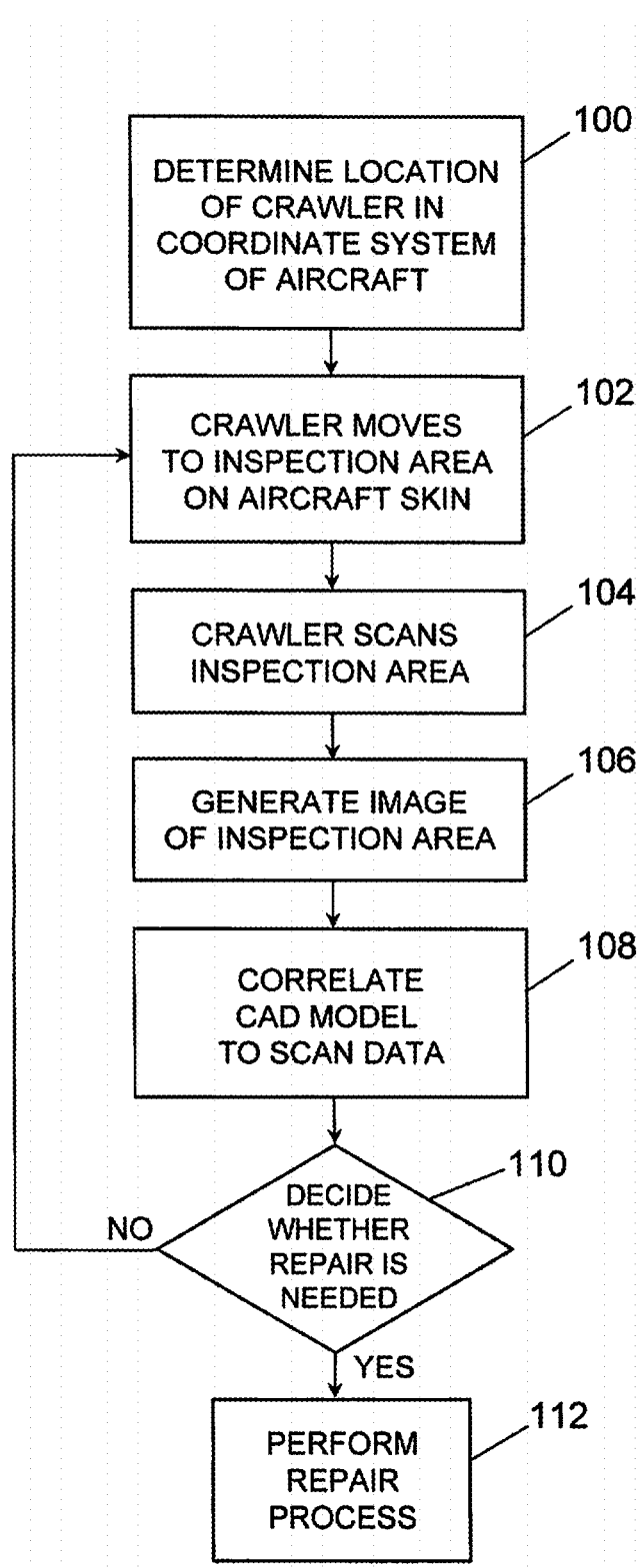
FIG. 7 is a flowchart showing steps of a nondestructive inspection process using a crawler vehicle equipped with an NDI scan array.

FIG. 7 is a flowchart showing steps of a nondestructive inspection process using a crawler vehicle equipped with an NDI scan array.

(1) The location of the crawler vehicle is determined in the coordinate system of the aircraft using a motion capture system or a local positioning system (step 100), so the location of the crawler vehicle relative to the aircraft can be guided and tracked.

(2) The crawler vehicle is instructed to move to the inspection area (step 102).

(3) In response to a further instruction to execute a programmed motion pattern over the inspection area, the crawler vehicle moves over the inspection area and scans it (step 104), or—if it cannot move directly over all damage features—the crawler vehicle scans around the edge where template orientation points can be marked.

(4) The NDI scan data from the NDI scanner on the crawler vehicle, along with the X-Y position information from the wheel rotation encoders, are integrated to generate a full or partial composite 2-D NDI scan image of the inspection area (step 106).

(5) After the NDI scan data has been collected, features from a CAD model of the aircraft are correlated with the NDI scan data for the most accurate depiction of the substructure (step 108). Since the location information of the inspection area (defined in the coordinate system of the aircraft) is known, that location information can be used to position and orient the 2-D image in the same visualization environment as a CAD model showing aircraft features, which model is defined in the same reference coordinate system. This can be accomplished as an overlay or side-by-side display. In an overlay display scenario, the 2-D NDI scan image is represented as a semi-transparent texture map that allows the CAD model features to be seen through the 2-D scan image. The side-by-side display situation will be described in detail later with reference to FIGS. 10 and 11.

(6) Based on observation and analysis of the overlay display, an inspector decides whether a repair is needed or not (step 110). If a repair is not needed, the crawler vehicle moves to the next area to be inspected (step 102) and continues the inspection process (7) If a determination is made in step 110 that repair is needed, an appropriate repair process is performed (step 112).

Figure 8:
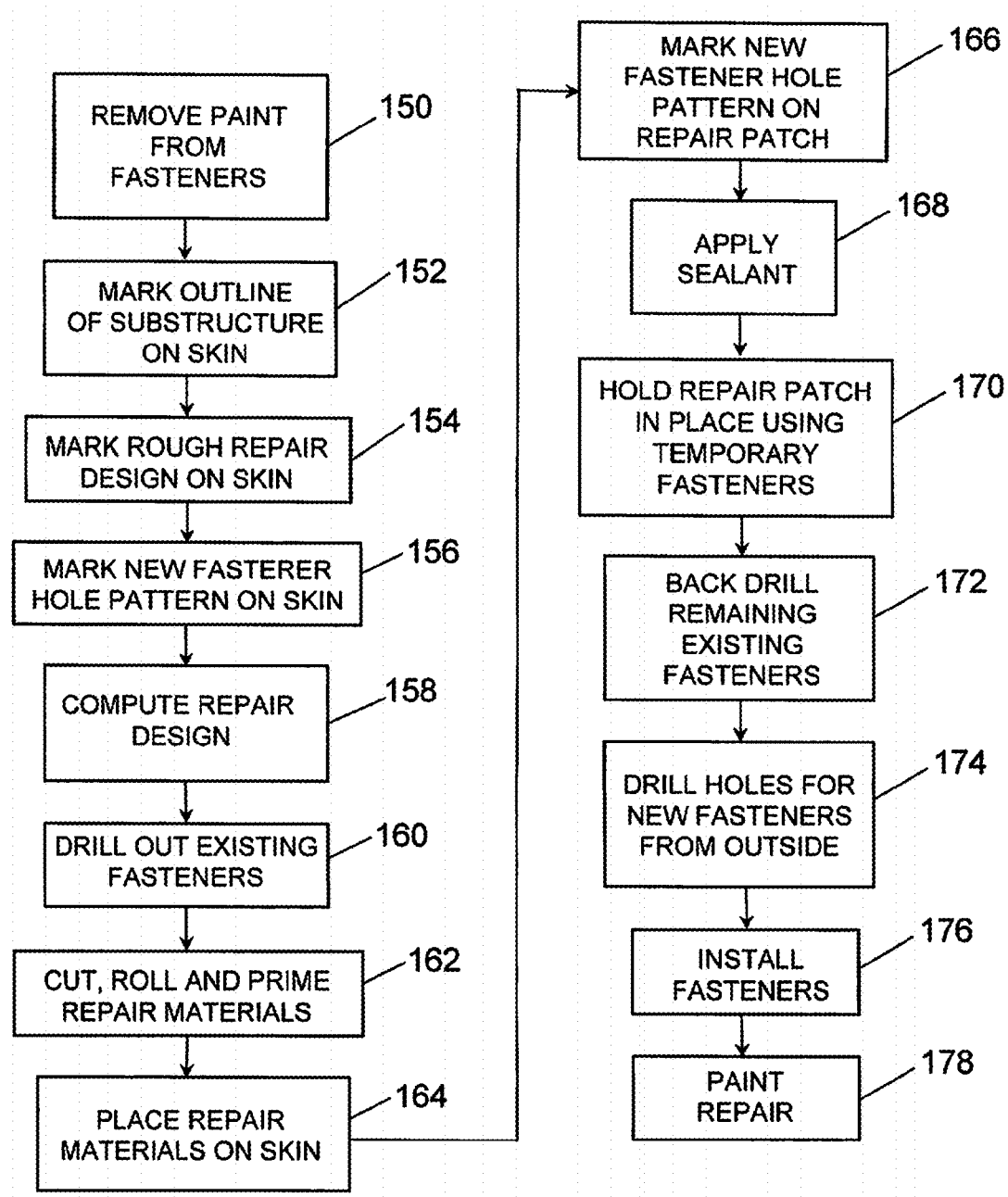
FIG. 8 is a flowchart showing steps of a process for repairing a damaged skin of an aircraft, which repair process employs automated marking using a crawler vehicle equipped with a marking instrument.

FIG. 8 is a flowchart showing steps of a process for repairing a damaged skin of an aircraft that employs a crawler vehicle equipped with a marking instrument. As previously described with reference to FIG. 6B, a crawler vehicle may be equipped with both an NDI scan array and a marking instrument. The process outlined in FIG. 8 is described below for the purpose of illustration. Automated marking also has application in repair process different than the example shown in FIG. 8. The exemplary process depicted in FIG. 8 comprises the following steps:

(1) After a repair site has been identified, the paint is removed from any fasteners near the suspect repair foot print (step 150).

(2) The crawler vehicle marks an outline of the substructure on the skin of the airplane based on CAD drawings and the existing fastener pattern (step 152).

(3) The crawler vehicle marks a rough repair design on the airplane skin (step 154).

(4) The crawler vehicle marks a new fastener hole pattern on the airplane skin (step 156).

(5) A repair design is created on a computer using the dimensions found on the airplane and using all of the rules set forth in the applicable structural repair manual (step 158). The repair design incorporates all the existing fastener holes found common to the repair and new fasteners locations. The design is marked on the airplane if different from the design computed in step 154 to assure there are no issues with the repair design.

(6) The existing fasteners common to the repair are drilled out from outside of the airplane (step 160).

(7) The repair materials (e.g., a filler and a repair patch) are cut to shape, rolled to shape, and primed (steps 162).

(8) The repair materials are placed on to the airplane (step 164).

(9) A few holes are back drilled from the existing fasteners from inside of the airplane. The new fastener patterns are marked on the repair (step 166).

(10) Sealant is placed between the repair materials and the airplane and between the respective repair materials (e.g., between a filler material and a repair patch) (step 168).

(11) Temporary fasteners are placed to hold the repair materials in place (step 170).

(12) The remaining existing fasteners common to the repair are back drilled from inside into the repair parts (step 172).

(13) New fasteners are drilled from the outside (step 174).

(14) All fasteners are installed (step 176).

(15) The repair is painted over (step 178).

An alternative to using a holonomic-motion crawler vehicle for marking would be to use a scanning system that attaches to and rasters an NDI scan probe (e.g., a sensor or sensor array) across the surface of a structure to provide a 2-D image of subsurface features. After collection of the NDI scan data, a marking instrument can be substituted for the NDI scan for marking selected locations on the surface where the NDI scan image was acquired.

FIGS. 9A and 9B are diagrams showing components of an inspection and marking system that combines a local positioning system 50 positioned at a stand-off distance from an aircraft 30 with a scanning and marking system 32 mounted on a surface of the aircraft's fuselage. In FIG. 9A, the scanning system is shown equipped with an NDI scan probe 46; in FIG. 9B, the scanning system is shown equipped with a marking instrument 34. In accordance with this embodiment, the NDI probe 46 and the marking instrument 34 are interchangeable. However, in accordance with alternative embodiments, both the marking instrument and the NDI scan probe can be mounted on the end effector of the scanning system, thereby avoiding the time and cost of removing one and installing the other.

The system shown in FIG. 9A can be employed to scan an inspection area on a surface of the aircraft 30 in a manner similar to what has been described with reference to FIG. 7. The system shown in FIG. 9B can be employed to mark locations of selected subsurface features, a repair design, and/or holes to be drilled in a manner similar to what has been described with reference to FIG. 8. The scanning system 32 can be controlled to perform the operations of FIGS. 7 and 8.

FIG. 9A shows an acquisition and analysis system for non-destructive inspection employing multiple hardware and software components (including a local positioning system 50). The local positioning system shown in FIG. 8 may be of the type disclosed in U.S. Pat. No. 7,859,655. In accordance with the embodiment shown in FIG. 9A, NDI scan data can be acquired and analyzed using an automated scanning system 32 and a local positioning system 50. The acquired data can be visualized and interacted with using 2-D and 3-D analysis software. Alignment points 45a, 45b and 45c, measured by the local positioning system 50 in the scanning area, are used to create a positional correspondence for setup of the scanning system 32 and registering the resulting 2-D scan data in the coordinate system of a 3-D CAD model visualization environment.

The local positioning system 50 depicted in FIG. 9A comprises a video camera 52 which may have automated (remotely controlled) zoom capabilities. The video camera 52 may additionally include an integral crosshair generator to facilitate precise locating of a point within an optical image field display of the video camera. The video camera 52 is supported on a pan-tilt mechanism 56 mounted on a tripod 54. The video camera 52 and the pan-tilt mechanism 56 may be operated by an LPS control computer 26. The LPS control computer 26 communicates with the video camera 52 and the pan-tilt mechanism 56 through a video/control cable. The pan-tilt mechanism 56 is controlled to rotationally adjust the video camera 52 to selected angles around a vertical, azimuth (pan) axis and a horizontal, elevation (tilt) axis. A direction vector 12, that describes the orientation of the camera relative to the fixed coordinate system of the tripod 54 (or other platform on which the pan-tilt unit is attached), is determined from the pan and tilt angles, as well as the position of the center of crosshair marker in the optical field when the camera 52 is aimed at a point of interest. A laser range meter 58 may be incorporated inside the housing of camera 52 or mounted to the outside of camera 52 in such a way that it transmits a laser beam along the direction vector 12. The laser range meter 58 is configured to measure distances to the aircraft 30. The laser range meter 58 may have a laser and a unit configured to compute distances based on the laser light detected in response to a laser beam reflected by a surface of the aircraft 30.

The apparatus shown in FIG. 9A also includes a scanning system 32 comprising a scanning unit 40 having a support rail 42 mounted on the aircraft 30 (e.g., by suction or vacuum pressure) and a translation rail 44 supporting an NDI scan probe 46. The translation rail 44 moves along the support rail 42 for a first scan axis and the NDI scan probe 46 moves along the translation rail 44 for a second scan axis, which may be perpendicular to the first scan axis. The scanning unit 40 uses internal position encoders (alternatively, a resolver could be utilized) to measure the relative position of the scan head holding the NDI scan probe 46. The scanning unit 40 is controlled by a scan control computer 48, which can control incremental movement of the scan head or end effector (and whichever device is attached to it) relative to the coordinate system of the scanning system, using closed-loop feedback control software.

As previously described with reference to FIG. 7, the NDI scan data and X-Y position information are integrated to generate a full or partial composite 2-D NDI scan image of the inspection area. Then features from a CAD model of the aircraft are correlated with the NDI scan data for the most accurate depiction of the substructure. Based on observation and analysis of a display in which a 2-D NDI scan image is represented as a semi-transparent texture map that allows the CAD model features to be seen through the 2-D scan image (or by using side-by-side comparisons of the 2-D scans and CAD models), an inspector decides whether a repair is needed or not. If a repair is needed, an appropriate repair process, including marking, can be performed as previously described with reference to FIG. 8.

FIG. 9B depicts a scenario wherein the NDI scan probe has been removed from the end effector and a marking instrument 34 has been installed in its place for use during a repair process. For the purpose of illustration, various markings which could be made by the marking instrument 34 under the control of scan control computer 48 are indicated. The dashed rectangles 38 represent markings outlining subsurface features hidden below the skin of the fuselage of aircraft 30. The solid line 36 represents a marking outlining the position and shape of a repair patch to be applied on the fuselage skin. The array of dots inside the solid line 36 represents the locations of holes to be drilled for attaching the repair patch to the skin. (In practice, the marking instrument 34 would draw small circles, not dots.)

A process for correlating features from a CAD model of the aircraft with the NDI scan data is described in U.S. Patent Application Publ. No. 2012/0327187. After the features from the CAD model of the aircraft have been correlated with the NDI scan data to produce an accurate depiction of the features hidden under a skin of the aircraft, the location of features to be marked can be selected manually or automatically using the 2-D scan and CAD images, such as those shown in FIGS. 10 and 11.

Figure 10:
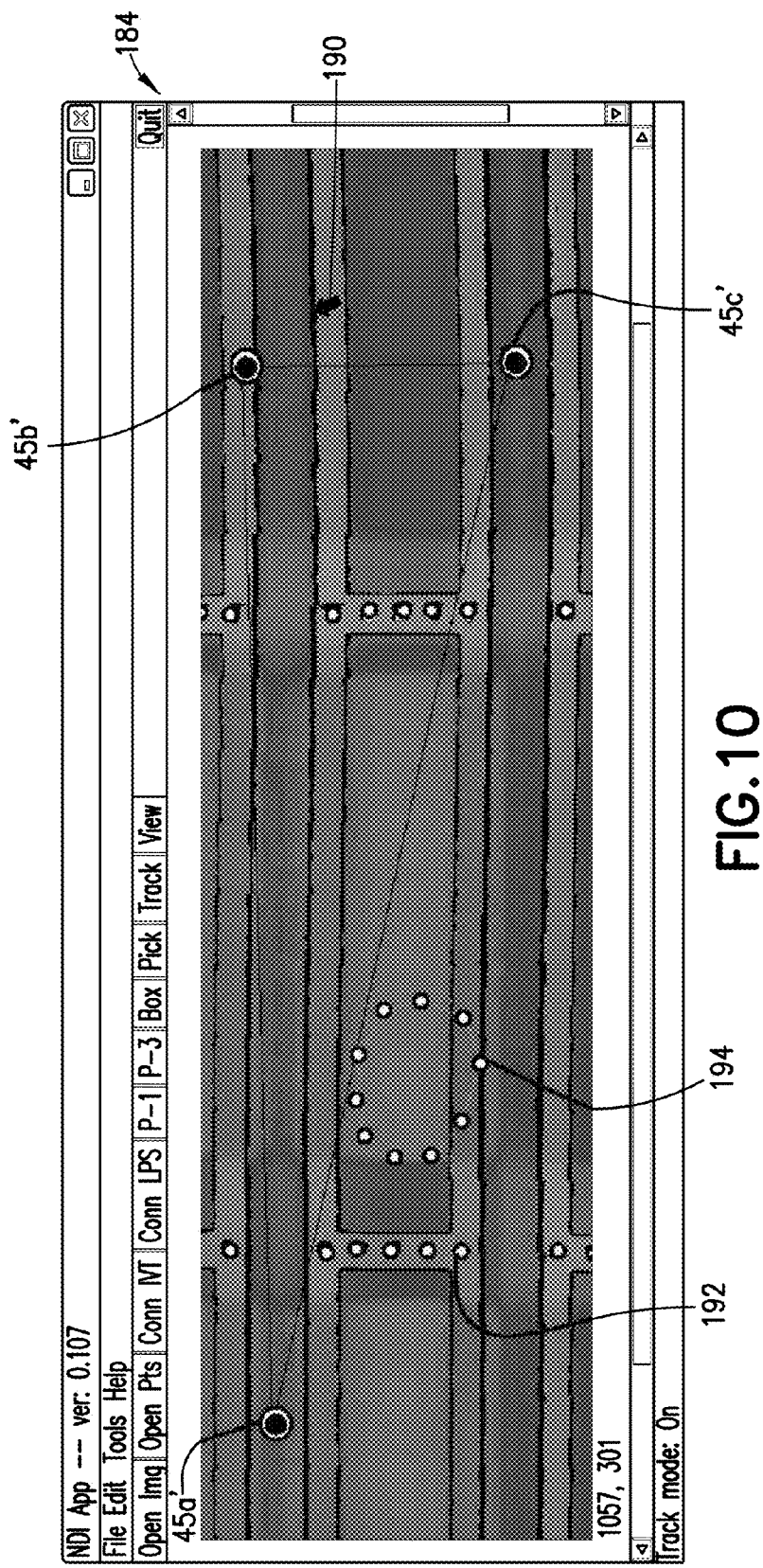
FIGS. 10 and 11 are respective screenshots of a side-by-side display of respective position representations which have been linked using a scan integration application, one screen showing a 2-D scan image (FIG. 10) and the other screen showing CAD model features (FIG. 11).

As disclosed in U.S. Patent Application Publ. No. 2012/0327187, an inverse of a scan registration matrix can be used to project 3-D coordinates from the 3-D environment onto a 2-D scan image. A 2-D scan image display screen 184 is shown in FIG. 10. With the 2-D/3-D registration computed by the scan registration matrix, any 2-D point selected on the display can be converted into the corresponding 3-D coordinates of the aircraft, or any 3-D point can be converted into corresponding 2-D pixel coordinates. As an example, representations of scan image registration points 45a', 45b' and 45c' corresponding to the three alignment marks 45a, 45b and 45c on the aircraft (shown in FIG. 8) are shown in FIG. 10.

Figure 11:
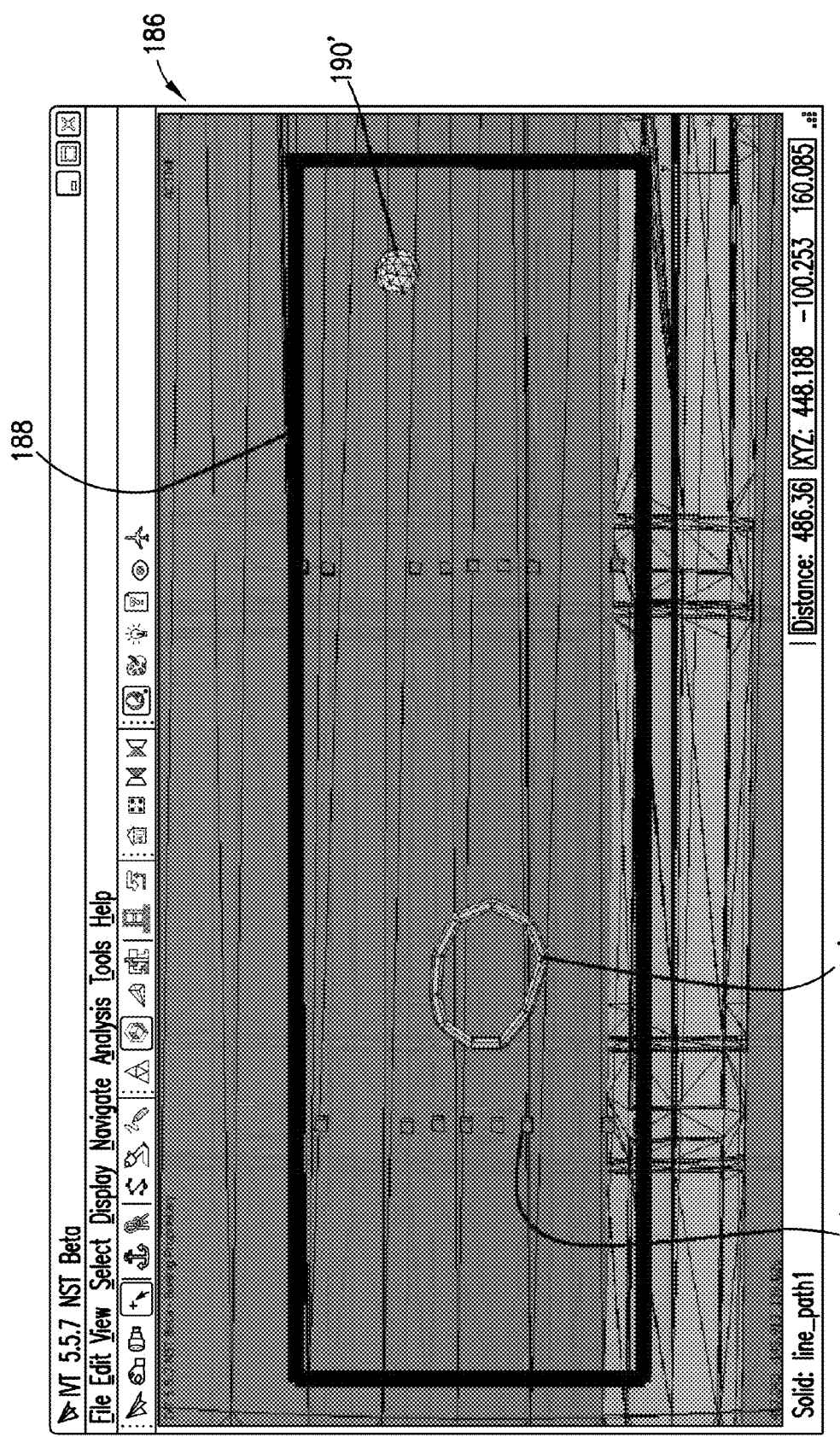

After a connection is established with a 3-D visualization application, the scan integration application provides 3-D coordinates to the 3-D visualization application to align the virtual camera of the 3-D virtual environment with the proper target coordinates, so that a presented 3-D view in the 3-D visualization display screen 186 is perpendicular to the surface at the scan location, as shown in FIG. 11. Viewed in conjunction, FIGS. 10 and 11 show respective screenshots of a side-by-side display of respective position representations which have been linked using a scan integration application, one screen 184 showing a 2-D scan image (FIG. 10) and the other screen 186 showing CAD model features (FIG. 11). As seen in FIG. 11, a rectangular frame object 188, used as a reference to outline the region or sub-region of the NDI scan area, is loaded into the 3-D visualization application for visualization on the display screen 186.

An NDI expert can make user inputs to manipulate both the 2-D and 3-D presentations. The NDI expert can point to specific locations in the display seen in FIG. 10 using a cursor 190 and can point to specific locations in the 3-D visualization display seen in FIG. 11 using a real-time proxy cursor 190'. Point objects 192 and poly-line geometry, such as line 194, shown in FIG. 10 can be drawn and imported into the 3-D visualization display, shown as points 192' and line 194' in FIG. 11. The cursor 190 and proxy cursor 190' are linked to each other so that moving one will move the other.

Similarly, point selection from the 3-D visualization application can also be displayed in the display screen 184 as 3-D coordinate data passed through the inverse scan registration matrix to create a properly registered 2-D point on the scan image. The view in the 3-D visualization environment can be pivoted around the proxy cursor 190' if necessary to see other views of the 3-D models. Other information, such as part numbers, dimensions, etc., can also be acquired from a 3-D CAD database and displayed by 3-D visualization application on 3-D visualization display screen 186.

The scan integration application can be used in conjunction with a motion platform (e.g., one which holds an NDI scan probe) which is movable relative to a fixed structure attached to the aircraft fuselage (e.g., of the type shown in FIG. 9A) or with a crawler vehicle (e.g., of the type shown in FIG. 2). In addition, the scan integration application can be employed in conjunction with either a local positioning system or a motion capture system, either of which can be used to track the location of an NDI scan probe or a marking instrument mounted to the motion platform.

Figure 12:
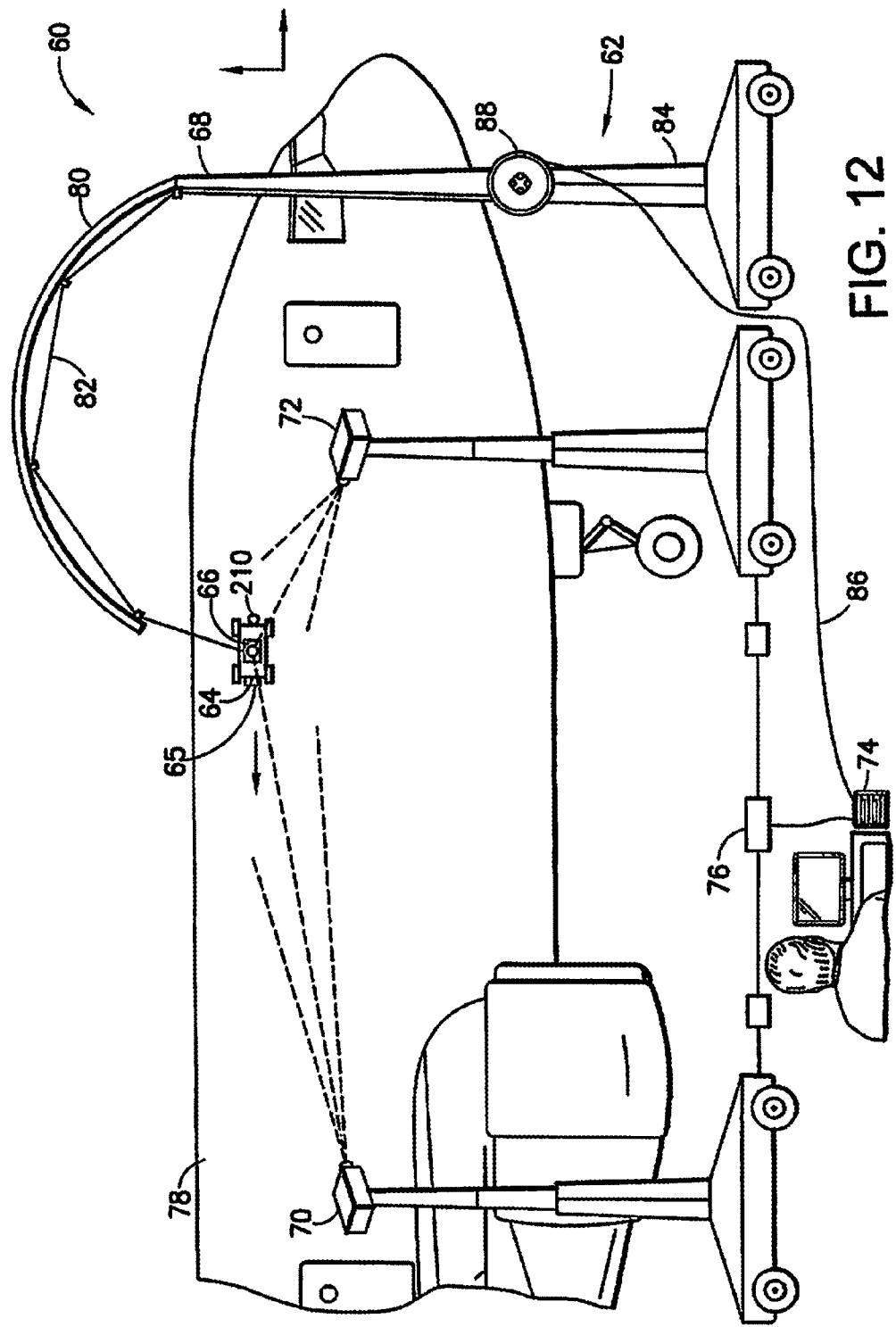
FIG. 12 is a diagram showing a system for inspecting the fuselage of an aircraft using a holonomic-motion crawler vehicle that is equipped with an NDI scan array and a marking instrument in accordance with another embodiment.

FIG. 12 shows an aircraft repair environment 60 in which a non-destructive inspection system 62 employs a holonomic-motion crawler vehicle 64 to inspect the fuselage 78 of an aircraft. The crawler vehicle comprises a connector (not shown) that secures the end of a flexible cable 82. The crawler vehicle 64 carries an NDI sensor or sensor array 65 and a marking instrument 210. In accordance with the embodiment shown in FIG. 12, the system operates in an imaging mode and then operates in a marking mode. In the imaging mode, the sensor or sensor array 65 acquires scan images as the crawler vehicle 64 travels over the surface of the fuselage 78 along a programmed scan motion path. In the marking mode, the crawler vehicle 64 can be guided under closed-loop feedback control to position the marking instrument 210 at selected locations and then deploy the marking instrument to mark the selected locations.

The crawler vehicle 64 also comprises a marker pattern support structure 66 (e.g., platform 127 shown in FIG. 2 or another part of the vehicle as disclosed in U.S. patent application Ser. No. 13/921,246) that supports at least three optical targets arranged in a known pattern. For example, the optical targets may be retro-reflective markers 128 as shown in FIG. 2 or active target markers of a type disclosed in U.S. patent application Ser. No. 13/921,246. The optical targets can be used in conjunction with location tracking systems 70 and 72 to acquire data for use in determining the position and orientation of crawler vehicle 64. In accordance with one embodiment, each location tracking system 70, 72 may comprise a video camera, a laser range meter and a pan-tilt unit, the functionality of such a location tracking system having been previously described with reference to FIG. 8. (In order to get full coverage of a large object such as an airplane without moving the LPS unit, more than one LPS unit can be used, the second LPS unit 72 covering the area adjacent to the area covered by the other LPS unit 70.) In accordance with another embodiment, the location tracking systems 70, 72 may be replaced with a motion capture system having the functionality previously described with reference to FIG. 5. (More than two video cameras can be used for motion capture.) The location tracking systems 70, 72 or motion capture system send acquired data to a controller 74 via respective cables and a network switch 76. The controller 74 may comprise a computer or processor programmed with scan integration application software, localization and location tracking application software, and motion control application software.

The crawler vehicle 64 is connected to a support system that comprises a cable 82 supported by a flexible boom 80. The flexible boom 80 is attached to a mobile frame 84. The cable 82 can be selectively played out from or wound on a reel 88, the amount of slack being maintained so that the cable will act as a tether to support the crawler vehicle 64 in the event that it unexpectedly releases from the fuselage surface. The cable 82 may further comprise lines for providing electrical power from a source (not shown) of electrical power on the ground to the stepper motors and the motors of the suction-based attachment system on crawler vehicle 64 and lines for communicating sensor data to controller 74 (via an electrical cable 86).

The system depicted in FIG. 12 uses a holonomic-motion crawler vehicle that can create any type of path, use position feedback to stay on target, attach to non-horizontal surfaces, and communicate with external systems for path information and tracking corrections.

Figure 13:
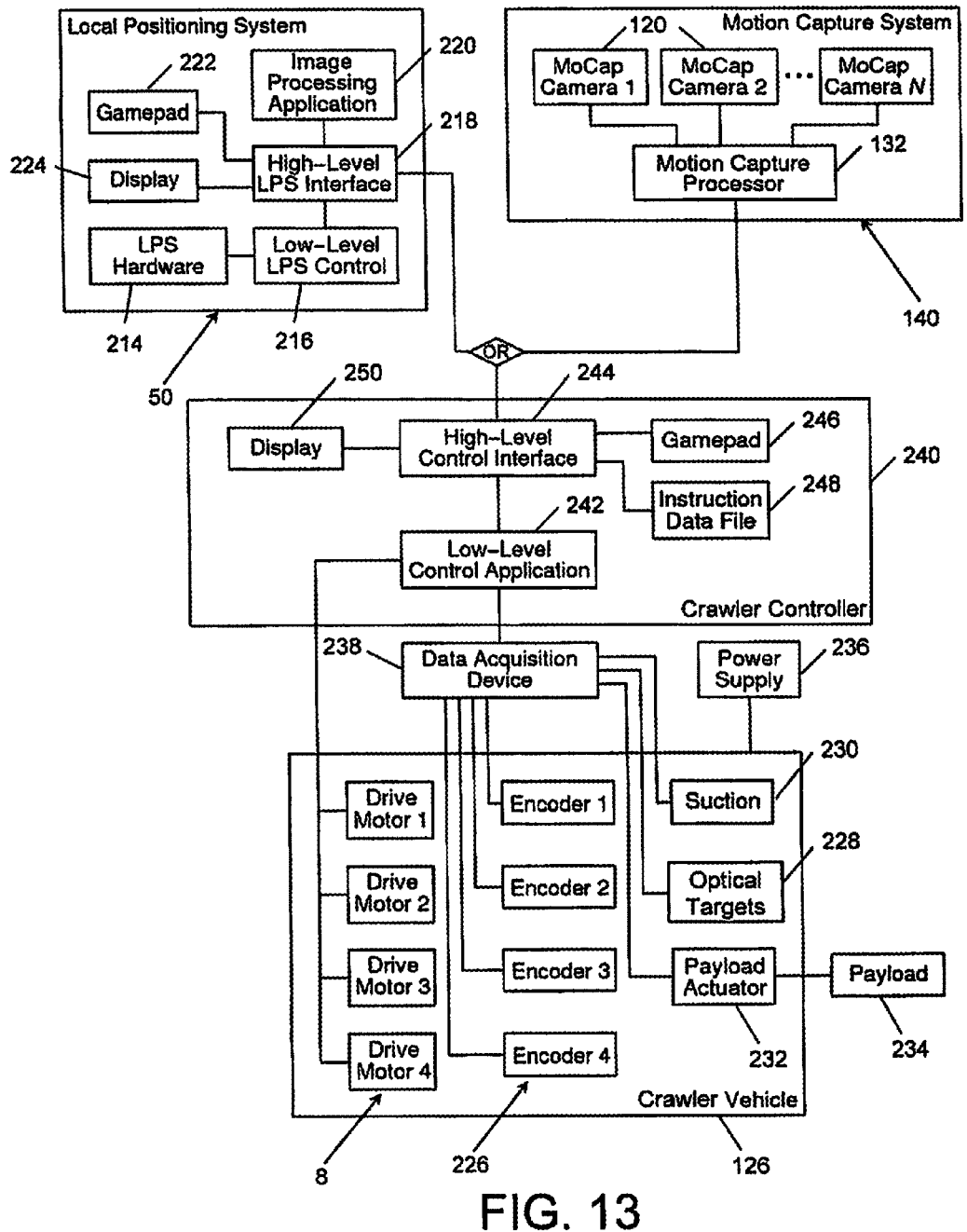
FIG. 13 is a block diagram showing the architecture of a system for tracking the location and controlling the motion of a holonomic-motion crawler vehicle using either a local positioning system or a motion capture system.

FIG. 13 is a block diagram showing an architecture of a system for tracking the location and controlling the motion of a crawler vehicle 126 using either a local positioning system 50 or a motion capture system 140. The crawler vehicle 126 carries a payload 234 for performing marking operations. For example, the payload 234 may comprise a marking pen or a sticker or tape applicator.

In accordance with one embodiment, crawler vehicle 126 comprises four Mecanum wheels (not shown) for enabling holonomic motion and suction devices 230 for enabling the crawler to crawl on a non-horizontal surface. Rotation of the Mecanum wheels is driven by respective drive motors 8, which may be stepper motors. The crawler vehicle 126 may further comprise a set of omni wheels (not shown) and a corresponding set of wheel rotation encoders 226 which output pulses in response to incremental rotation of respective omni wheels, as disclosed in U.S. patent application Ser. No. 13/796,584. Encoder pulses representing encoder counts are sent from the wheel rotation encoders to a data acquisition device 238 via an electrical cable. Optionally, the crawler vehicle could be equipped with an inclinometer that provides data representing the angle of inclination of the vehicle or respective sensors that provide data representing the loads on each Mecanum wheel. The crawler vehicle 126 receives electrical power from power supply 236 via the same electrical cable.

The local positioning system 50 comprises a computer programmed with a low-level LPS control application 216, a high-level LPS interface 218, and an image processing application 220. The high-level LPS interface 218 sends operational commands to the low-level LPS control application 216, receives image processing results from the image processing application 220, and sends crawler vehicle location data along a dedicated or network connection to a high-level control interface 244 of a crawler controller.

The low-level LPS control application 216 controls the operation of the LPS hardware 214, including a laser range finder, a video camera and a pan-tilt mechanism. In particular, the low-level LPS control application software comprises a low-level control signal generator module which has an internal feedback control loop that receives operational commands from the high-level LPS interface 218 and determines the specific low-level control signals to send to the drive motors of the pan-tilt mechanism (not shown in FIG. 13). The local positioning system 50 also comprises a gamepad 222 and a display monitor 224.

The image processing application 220 computes the pixel coordinates of each indicator light relative to an indicator image by processing the image data acquired by the LPS video camera. The image processing computations include image distortion correction, image differencing, image segmentation, and calculating the pixel coordinates of the centroid of each image segment, as disclosed in U.S. patent application Ser. No. 13/921,246.

Alternatively, if motion capture system 140 is selected, the motion capture processor 132 collects real-time image information from all instances of the motion capture cameras 120, processes the data, and sends the processed data along a dedicated or network connection to the high-level control interface 244 of the crawler controller 240.

The crawler controller 240 controls the operation of the crawler vehicle 126. The crawler controller 240 may comprise a separate computer programmed with crawler motion control application software, including a low-level control application 242 and high-level control interface 244. The crawler controller 240 also comprises a gamepad 246 and a display monitor 250.

The high-level control interface 244 receives crawler vehicle location data from the selected location tracking system (i.e., local positioning system 50 or motion capture system 140), retrieves instruction data from an instruction data file 248, and sends operational commands to the low-level control application 242. The instruction data file 248 stores instructions representing a sequence of action events, including path plan data for the crawler vehicle 126 which defines a series of move-to goal locations and motion speeds. The instruction data file 248 also contains instructions for other crawler actions, such as settings for suction levels, the position of the payload actuator 232, indicator light states (when optical targets 228 are indicator lights rather than retro-reflective markers), and other commands such as resetting the values for encoders 226.

The low-level control application 242 can send commands to the drive motors 8 to produce desired movements of the crawler vehicle 126. More specifically, the low-level control application software comprises a low-level control signal generator module which has an internal feedback control loop that receives operational commands from the high-level control interface 244 and determines the specific low-level control signals to send to the drive motors 8 of the crawler vehicle 126. The low-level control application 242 can also send control signals to the data acquisition device 238 for performing the following operations: (1) resetting the values of encoders 226; (2) setting the suction levels of suction devices 230; (3) activating optical targets 228; and (4) commanding the payload actuator 232 to actuate the payload 234.

As used herein, the term "marking" means any process that applies material to a surface, such as ink, paint, solder, adhesive, stickers or tape. Marking can also be performed using devices such as a laser to alter the surface. The motion platform can be setup to accept multiple types of marking modules. Which one that the operator chooses to use depends on the application. Multiple marking devices can be attached to the system at the same time, but in different locations. The control computer is programmed with the location of each of the marking instruments relative to the base of the crawler vehicle. Each marking module can be extended or retracted by the control computer based on the current task plan. For example, if the task required drawing a line that changes from blue to red midway along its length, the crawler vehicle can be moved so that a blue pen draws a first segment of the line, stopped to allow time for the blue pen to be retracted, moved to a location such that a red pen is aligned with the end of the blue line segment, stopped to allow time for the red pen to be engaged with the surface, and then moved so that the red pen draws a second segment of the line. Many marker configurations are possible. For example, it should be possible to set up a system with marking pens on one end of the crawler vehicle and a sticker gun or masker unit on the other end.

The existing solution of marking of feature edges around repairs is tedious, time-consuming, and is often inexact and prone to errors. It also requires someone to crawl around the airplane or lean out from a lift, further increasing the likelihood of errors and mis-drilling. The operator can also get tired and the potential for costly errors increases.

This systems disclosed above are automated, thereby avoiding tedious and potentially imprecise manual marking on an aircraft surface for drilling for bolted repairs. Nor are the disclosed systems subject to human errors associated with manual measurements. Each system can be used as part of a maintenance system for both inspections and repairs.

While apparatus and systems have been described with reference to various embodiments, it will be understood by those skilled in the art that various changes may be made and equivalents may be substituted for elements thereof without departing from the scope of the claims. In addition, many modifications may be made to adapt a particular situation to the teachings disclosed herein without departing from the essential scope thereof. Therefore it is intended that the claims not be limited to the particular embodiments disclosed.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, a computer system may comprise respective processors incorporated in a plurality of devices (such as a video camera, a pan-tilt mechanism, a laser range meter, and motors) and a control computer in communication with those processors.

As used in the claims, the term "robotic arm" should be construed to include at least the translation rail shown in FIG. 8 and articulated arm mechanisms.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. An apparatus comprising a holonomic-motion crawler vehicle, an actuator and a plurality of optical targets mounted to said holonomic-motion crawler vehicle, said optical targets being arranged in a pattern, and a marking device coupled to said actuator,
   wherein said actuator has a first state in which said marking device moves relative to said holonomic-motion crawler vehicle from a retracted position to an extended position, and a second state in which said marking device moves relative to said holonomic-motion crawler vehicle from said extended position to said retracted position, and
   wherein said holonomic-motion crawler vehicle comprises:
   a frame comprising first and second suction;
   a plurality of wheels rotatably mounted to said frame, each wheel comprising a respective plurality of rollers having axes of rotation not parallel to an axis of rotation of said wheel;
   a plurality of motors equal in number to the number of wheels, each motor being operable to drive rotation of a respective one of said wheels; and
   first and second controllable suction devices for producing respective suction forces in said first and second suction zones when said wheels are all in contact with a surface.

2. The apparatus as recited in claim 1, wherein said marking device comprises a marking instrument having a tip.

3. The apparatus as recited in claim 1, wherein said holonomic-motion crawler vehicle further comprises a plurality of omni wheels and a plurality of wheel rotation encoders respectively coupled to said omni wheels.

4. The apparatus as recited in claim 1, further comprising a nondestructive inspection scan array mounted to said holonomic-motion crawler vehicle.

5. The apparatus as recited in claim 1, wherein said optical targets are retro-reflective markers.

6. The apparatus as recited in claim 1, wherein said optical targets are indicator lights.

7. A system comprising:
a target object having a surface;
a holonomic-motion crawler vehicle in contact with said surface and located at an initial location relative to a frame of reference of the target object;
an actuation system for causing said holonomic-motion crawler vehicle to move relative to the frame of reference of the target object;
a marking device supported by said holonomic-motion crawler vehicle;
an actuator for causing said marking device to move relative to said holonomic-motion crawler vehicle between a retracted state wherein a part of said marking device is not in contact with said surface and an extended state wherein said part of said marking device is in contact with said surface;
a location tracking system programmed to be capable of determining a current location of said part of said marking device relative to the frame of reference of the target object when said part of said marking device is in contact with said surface; and
a motion controller programmed to be capable of controlling motion of said holonomic-motion crawler vehicle relative to said surface and controlling motion of said marking device relative to said holonomic-motion crawler vehicle, the motion of said holonomic-motion crawler vehicle relative to said surface being a function of a difference between said current location of said part of said marking device as determined by said location tracking system and a target location of said part of said marking device.

8. The system as recited in claim 7, further comprising a non-destructive inspection scanner supported by said holonomic-motion crawler vehicle.

9. The system as recited in claim 7, wherein said marking device comprises a marking instrument and said part of said marking device comprises a tip of said marking instrument.

10. The system as recited in claim 7, wherein said holonomic-motion crawler vehicle comprises a plurality of omni wheels and a plurality of wheel rotation encoders respectively coupled to said omni wheels.

11. The system as recited in claim 7, wherein said motion platform comprises a robotic arm and a non-destructive inspection scan probe mounted to said robotic arm.

12. The system as recited in claim 7, wherein said location tracking system comprises a local positioning system.

13. The system as recited in claim 7, wherein said location tracking system comprises a motion capture system.

14. A method of marking locations on a surface, comprising:
moving a holonomic-motion platform over a surface area along a programmed motion path by causing omni wheels of the holonomic-motion platform to rotate;
scanning the surface area using a scan probe mounted to the platform as the holonomic-motion platform is moved along the programmed motion path to acquire scan data, wherein said scan data comprises subsurface feature data;
correlating model feature data with said subsurface feature data;
selecting a target location on the surface area to be marked based on results of said correlating step;
moving the holonomic-motion platform over the surface area to a location whereat a part of a retracted marking device carried by the holonomic-motion platform would overlie said target location if the marking device were extended; and
extending the marking device so that the part of the marking device contacts the surface or a patch overlying the surface.

15. The method as recited in claim 14, further comprising moving the holonomic-motion platform over the surface area along a motion path that causes the part of the extended marking device to contact the surface along a line that starts at said target location.

16. The method as recited in claim 14, wherein said selecting step comprises using a feature or edge recognition software application to recognize a feature or edge the location of which should be marked.

17. The method as recited in claim 14, further comprising tracking a location of optical targets arranged in a known pattern on the platform using a local positioning system of a type which has a camera and a laser range meter on a controllable pan-tilt unit.

18. The method as recited in claim 14, further comprising tracking a location of optical targets arranged in a known pattern on the holonomic-motion platform using a motion capture system of a type that triangulates a three-dimensional position of the holonomic-motion platform between multiple cameras configured to provide overlapping projections.

19. A method for marking a surface on a target object using a computer-controlled holonomic-motion crawler vehicle that moves on a plurality of omni wheels and carries a marking device and a non-destructive scan probe, said method comprising:
causing the omni wheels of the holonomic-motion crawler vehicle to rotate so that the non-destructive scan probe scans an area of the surface to acquire a scan image of that scanned surface area;
selecting a feature having a target location within the scanned surface area;
causing the omni wheels of the holonomic-motion crawler vehicle to rotate until a part of the marking device overlies the target location; and
actuating the marking device so that the part marks the target location.

20. The method as recited in claim 19, further comprising:
acquiring relative motion data representing incremental motion of the holonomic-motion crawler vehicle; and
controlling the motion of the holonomic-motion crawler vehicle as a function of the relative motion data.

* * * * *